US012730818B2

(12) United States Patent
Sharifi et al.

(10) Patent No.: US 12,730,818 B2
(45) Date of Patent: Sep. 8, 2026

(54) ADAPTIVE DEADLINE BOUNDED QUERY EXECUTION USING GENERATIVE MODEL(S)

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/970,145

(22) Filed: Dec. 5, 2024

(65) Prior Publication Data

US 2026/0161651 A1 Jun. 11, 2026

(51) Int. Cl.
*G06F 16/2457* (2019.01)
*G06F 11/34* (2006.01)
*G06F 16/2453* (2019.01)

(52) U.S. Cl.
CPC .... *G06F 16/24573* (2019.01); *G06F 11/3419* (2013.01); *G06F 16/24535* (2019.01); *G06F 16/24542* (2019.01)

(58) Field of Classification Search
CPC ......... G06F 16/24573; G06F 16/24542; G06F 16/24535; G06F 11/3419
See application file for complete search history.

(56) References Cited

U.S. PATENT DOCUMENTS 9,064,013 B1 * 6/2015 Gay .................... H04L 67/1001
12,141,134 B1 11/2024 Powar
12,292,811 B1 * 5/2025 Deb .................... G06F 11/3419
2009/0248631 A1 * 10/2009 Alba .................... G06F 16/2457
2009/0327214 A1 * 12/2009 Richardson ....... G06F 16/24545
2012/0047125 A1 * 2/2012 Day .................. G06F 16/24542 707/718
2013/0080417 A1 * 3/2013 Kashyap ........... G06F 16/24545 707/718
2014/0214880 A1 7/2014 Chi
(Continued)

OTHER PUBLICATIONS

KR Ministry of Intellectual Property, International Search Report and Written Opinion issued in Application No. PCT/US2025/057947, 9 pages, dated Apr. 7, 2026.

*Primary Examiner* — William P Bartlett
(74) *Attorney, Agent, or Firm* — Gray Ice Higdon

(57) ABSTRACT

Responsive to receiving an input query at a client device, an execution scheme to comply with a deadline for generating a comprehensive response which is responsive to the input query can be generated. The execution scheme can include a plurality of sub-queries decomposed from the input query, each associated with an estimated execution time. As such, generating the execution scheme can include generating the execution scheme such that the total of the estimated execution times complies with the deadline. The sub-queries can then be processed, based on the execution scheme, to generate corresponding sub-query responses. In response to determining that each of the sub-queries of the execution scheme have been processed, a comprehensive response to the input query can be generated using the sub-query responses. The comprehensive response can then be rendered, at the client device or another client device determined to be associated with the client device.

22 Claims, 13 Drawing Sheets

(56) References Cited

U.S. PATENT DOCUMENTS

| | | | | |
|---|---|---|---|---|
| 2018/0063280 | A1* | 3/2018 | Gay | H04L 67/60 |
| 2018/0101601 | A1* | 4/2018 | Brown | G06F 16/3329 |
| 2020/0175010 | A1 | 6/2020 | Vaghani | |
| 2020/0366566 | A1 | 11/2020 | Avasarala | |
| 2022/0012238 | A1* | 1/2022 | Gerweck | G06F 16/27 |
| 2023/0205773 | A1 | 6/2023 | Schmiedehausen | |
| 2024/0202539 | A1* | 6/2024 | Poirier | G06F 16/338 |

* cited by examiner

300

PROCESS, USING GM(S), PROMPT THAT IS BASED ON INPUT QUERY TO GENERATE NON-COMPREHENSIVE RESPONSE 312

DETERMINE, BASED ON NON-COMPRHENSIVE RESPONSE, WHETHER TO GENERATE COMPRENSIVE QUERY 314

DETERMINE BASED ON WHETHER NON-COMPREHENSIVE RESPONSE INCLUDES TOKEN(S) INDICATING THAT THE EXECUTION SCHEME BE GENERATED 316

DETERMINE BASED ON ESTIMATED EXECUTION TIMES OF CANDIDATE EXECUTION SCHEMES 318

DETERMINE BASED ON PROCESSING, USING GM(S), INPUT QUERY AND NON-COMPREHENSIVE RESPONSE AND, OPTIONALLY, SUB-QUERIES AND TOOLS 320

PROVIDE PROMPT AT CLIENT DEVICE, OPTIONALLY ALONG WITH NONCOMPREHENSIVE RESPONSE, AND DETERMINE BASED ON FEEDBACK TO PROMPT 322

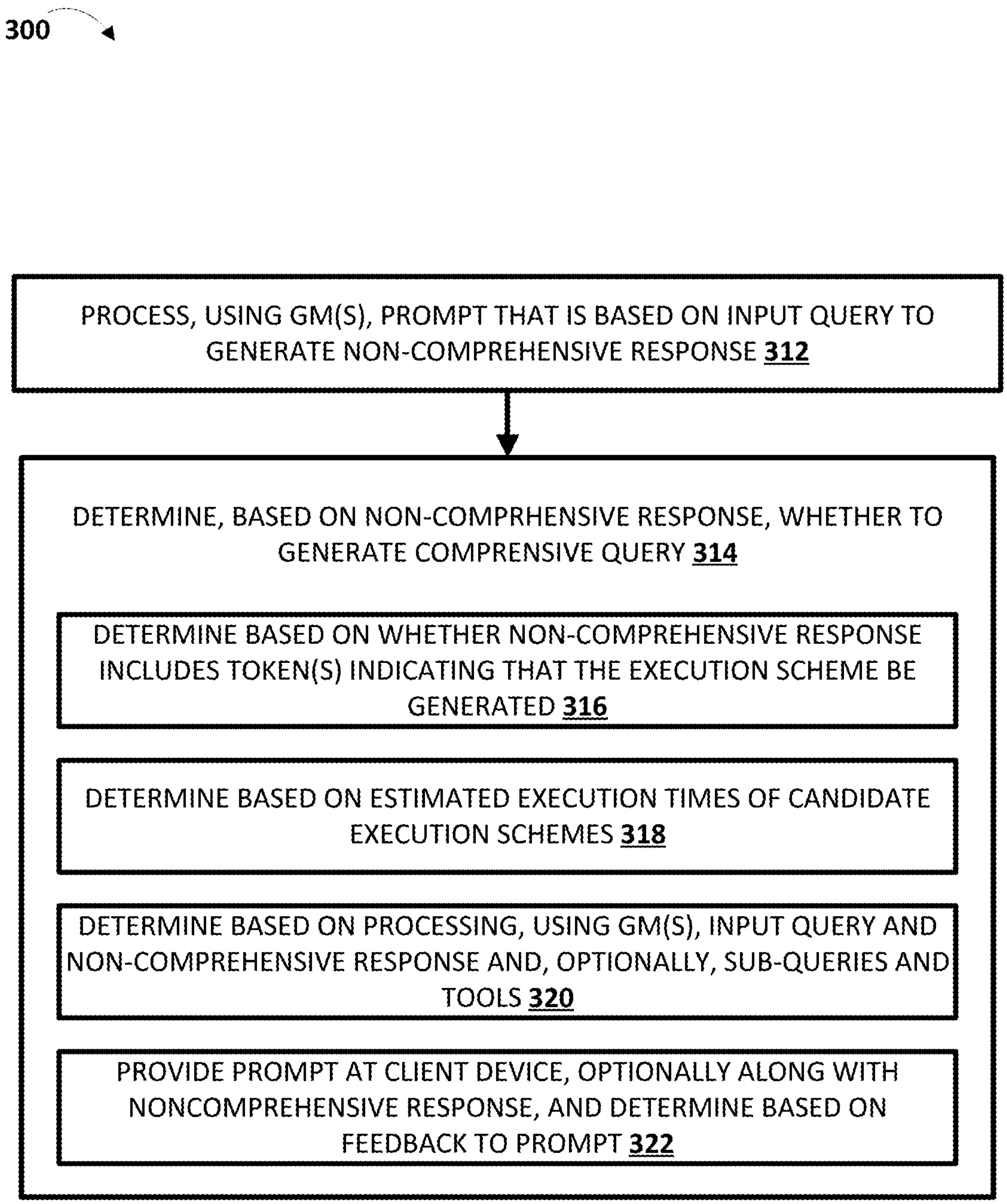

RECEIVE AN INPUT QUERY THAT IS GENERATED BASED ON USER INTERFACE INPUT AT A CLIENT DEVICE 710

GENERATE AN EXECUTION SCHEME TO COMPLY WITH A DEADLINE FOR GENERATING A COMPREHENSIVE RESPONSE WHICH IS RESPONSIVE TO THE INPUT QUERY 720

DECOMPOSE THE INPUT QUERY, TO DETERMINE A PLURALITY OF SUB-QUERIES, AND FOR EACH OF THE SUB-QUERIES, ONE OR MORE CORRESPONDING TOOLS TO UTILIZE IN PROCESSING THE SUB-QUERY 722

GENERATE THE EXECUTION SCHEME BASED ON THE PLURALITY OF SUB-QUERIES, WHEREIN EACH SUB-QUERY IS ASSOCIATED WITH AN ESTIMATED EXECUTION TIME, AND WHEREIN GENERATING THE EXECUTION SCHEME INCLUDES GENERATING THE EXECUTION SCHEME SUCH THAT THE TOTAL OF THE ESTIMATED EXECUTION TIMES FOR EACH OF THE SUB-QUERIES COMPLIES WITH THE DEADLINE 724

BASED ON THE EXECUTION SCHEME, AND FOR EACH OF THE SUB-QUERIES, PROCESS THE SUB-QUERY, USING THE ONE OR MORE CORRESPONDING TOOLS FOR THE SUB-QUERY, TO GENERATE ONE OR MORE CORRESPONDING SUB-QUERY RESPONSES 730

IN RESPONSE TO DETERMINING THAT EACH OF THE SUB-QUERIES OF THE EXECUTION SCHEME HAVE BEEN PROCESSED, GENERATE THE COMPREHENSIVE RESPONSE TO THE INPUT QUERY 740

CAUSING THE COMPREHENSIVE RESPONSE TO BE RENDERED, AT THE CLIENT DEVICE OR ANOTHER CLIENT DEVICE DETERMINED TO BE ASSOCIATED WITH THE CLIENT DEVICE, AS RESPONSIVE TO THE INPUT QUERY 750

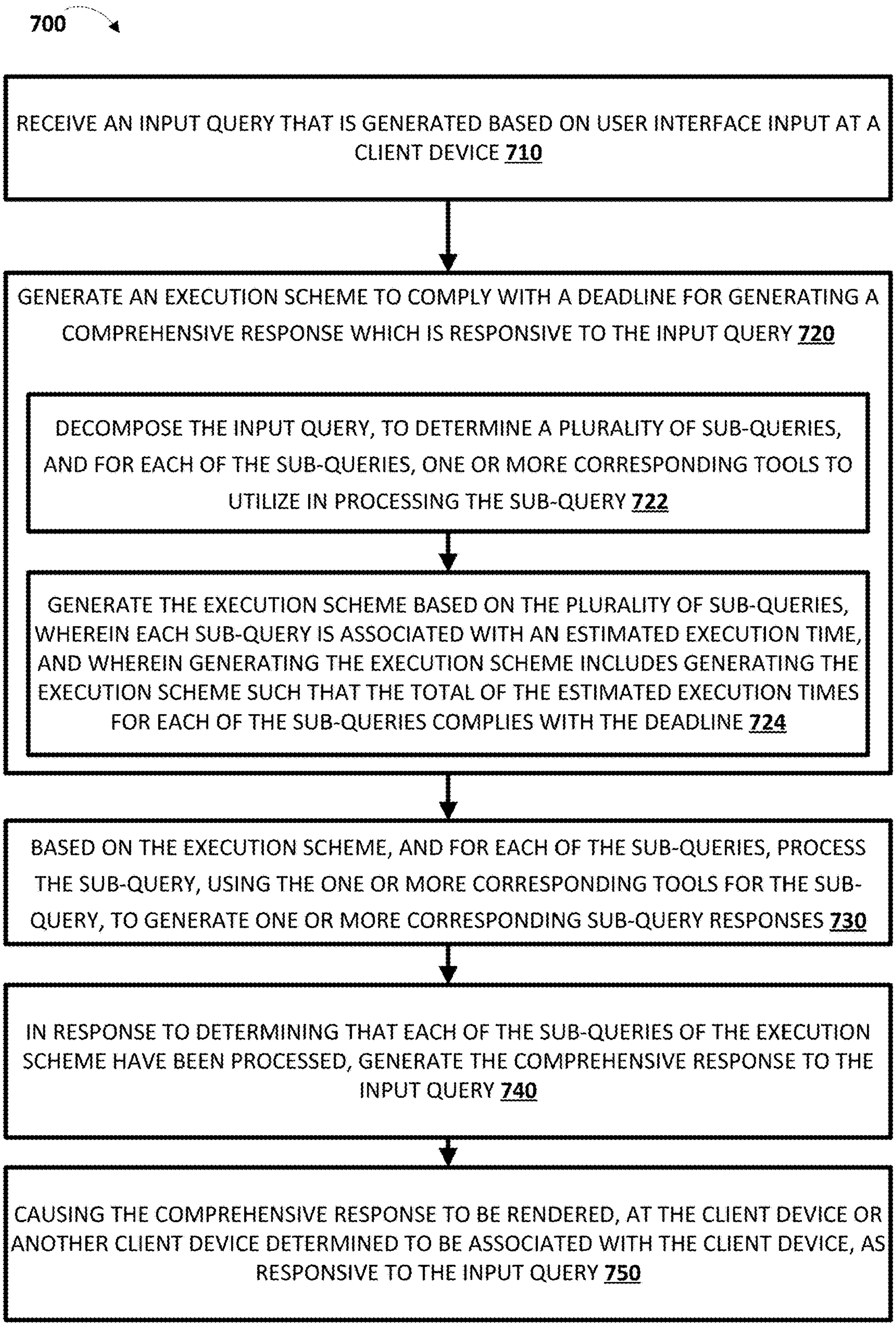

FIG. 7

ADAPTIVE DEADLINE BOUNDED QUERY EXECUTION USING GENERATIVE MODEL(S)

BACKGROUND

Various generative models (GMs) have been proposed that can be used to process natural language (NL) content and/or other input(s) (e.g., image(s) that accompany NL content), to generate output that reflects generative content (e.g., NL content, image(s)) that is responsive to the input(s). For example, large language models (LLM(s)) have been developed that can be used to process NL content and/or other input(s), to generate LLM output that reflects NL content and/or other content that is responsive to the input(s). For instance, a GM such as an LLM can be used to process NL content of "Plan me a day out in London before my vacation next Wednesday", to generate corresponding GM output. The GM output can reflect, for example, a summary of recommended restaurants, landmarks and activities that are available in London. The GM output can be generated, for example, based on intrinsic learned parameters of the GM itself. In addition, in most cases, the provision of the NL content can be followed by an immediate response (e.g., based on a single inference by the GM), which may be streamed back to the user to minimize perceived latency.

However, current utilizations of GMs may suffer from one or more drawbacks. For example, for more complex input queries, it may be beneficial to perform multiple computer actions to provide more comprehensive results, or results that are more likely to be responsive to a given input query, even if doing so could introduce additional latency. For instance, when a GM is used to process the NL content of "Plan me a day out in London before my vacation next Wednesday", the immediately provided GM output can reflect information that is useful to the user but that is ultimately not sufficiently comprehensive and/or responsive to the input query. Instead, the GM output may merely serve as a good starting point for the user to perform further computer actions directed toward planning a day out in London (e.g., exploring the menu options and opening times of the restaurants, the opening times and ticket prices of the landmarks and activities, finding the proximity of the various venues to a hotel the user is staying at, calling the venues to book tables and tickets, etc.).

As a result, by immediately providing a response without consideration of how much time is available before a task should be completed, the response may be less likely to be sufficiently comprehensive and/or responsive to the input query, and scarce resources may be unnecessarily and/or inefficiently consumed. For instance, when there is a relatively long time remaining before a deadline for completing the task, it may be beneficial for relatively more processing to be performed (e.g., by performing more of the computer actions) such that a response that is more likely to be comprehensive and/or responsive to the input query can be provided. Moreover, by immediately providing a response, processing can be caused to be immediately performed (e.g., potentially during high server-load times), resulting in unnecessarily inefficient and high-cost computing resource usage.

SUMMARY

Implementations described herein can enable adaptive deadline bounded task coordination and execution. More specifically, implementations described herein can enable the determination of an appropriate level of processing in order to provide a response to a task outlined by an input query. The level of processing can be determined based on a deadline for the response to be provided. Implementations described herein also enable the coordination of the execution of the processing in order to provide the response before the deadline. The processing can include processing sub-queries decomposed from an initial input query, whereby each sub-query is associated with one or more corresponding tool(s) to be utilized in processing the corresponding sub-query. Moreover, the execution of the processing can be coordinated by generating and utilizing an execution scheme to generate a comprehensive response to the input query ahead of the deadline, and which can be generated based on processing, using one or more GM(s), the input query. Implementations described herein can also provide a mechanism for a user to provide a deadline, as well as a mechanism to enable a user to adapt the coordination of the processing.

For example, an input query specifying a task can be provided by a user. In addition, a deadline can be determined for completing the task. The deadline can then be used to determine the level of processing that should be performed in order to ensure that the resulting response is most likely to be comprehensive and/or responsive to the input query, and provided within the specified timeframe. In particular, once a deadline has been determined, different aspects of the processing can be adapted to meet the deadline (e.g., and reflected in an execution scheme). Furthermore, while a longer running task is in progress, the user can interrupt execution, modify one or more aspects of the processing, or check on the current status of the execution. In some cases, the longer running task can be automatically updated and/or interrupted (e.g., without any user input being received), for instance, when the processing is taking longer than estimated and the deadline would otherwise be missed.

By facilitating a longer running process time (e.g., for tasks that do not require an immediate response and/or that would benefit from longer processing) implementations described herein can enable a response which is more likely to be comprehensive and/or responsive to a given input query to be provided. For example, following the example above, based on the input query including the text " . . . next Wednesday" and responsively determining a relatively long deadline (e.g., 9 days), rather than simply providing a summary, the GM based response system could identify candidate restaurants, landmarks, and activities based on various searches; call the candidate restaurants, landmarks, and activities to book a table at one of the restaurants and tickets for the landmarks and activities accordingly; determine a navigation route between each the booked restaurant, landmarks and activities; and compile an itinerary based on the results. Moreover, by facilitating a longer running process time, processing that would otherwise be forced to be immediately performed can instead be deferred to a more favorable time (e.g., during estimated or measured periods of lesser server load and/or periods of more abundant energy availability, to ensure that the latest possible information is used when generating the comprehensive response to the input query, etc.,).

In addition, by providing a mechanism by which a deadline for completing the task can be provided, the longer running process time can be bounded. In this way, utilization of computer resources for performance of superfluous or optional computer actions, that might otherwise be performed without any bounding on the process time, can be eliminated or reduced. In other words, implementations described herein can provide a mechanism by which the user can provide input to control the balance between processing time (e.g., and therefore utilization of computer resources) and latency in receiving a response to an input query.

In these and other manners, computer resources for processing to complete a task can be appropriately allocated based on a deadline for completing the task, and efficiently utilized. In addition, the utilization of computer resources in manual performance of various additional computer actions, and the resulting manual switching between various applications and/or interfaces that might otherwise be necessary to complete a complex task can be eliminated or at least reduced.

Implementations disclosed herein can additionally or alternatively serve to proactively guide a human to computer dialog and/or to lessen a quantity of dialog turns required for responding to an input query (e.g., to improve the comprehensiveness and/or responsiveness of one or more initially provided responses). Moreover, implementations described herein can specify a mechanism enabling user input, such as entering text, making a selection, or submitting a command to control the coordination and/or execution of processing in order to provide a response (e.g., by providing a deadline, by interrupting and/or modifying the processing, etc.,).

In some implementations, an LLM or other generative model can include at least hundreds of millions of parameters. In some of those implementations, the LLM or other generative model includes at least billions of parameters, such as one hundred billion or more parameters. In some additional or alternative implementations, an LLM is a sequence-to-sequence model, is Transformer-based, can include an encoder and/or a decoder, can process multimodal input(s) (e.g., natural language and image(s)), and/or can generate multi-modal output(s). One non-limiting example of an LLM is GOOGLE'S Pathways Language Model (PaLM). Another non-limiting example of an LLM is GOOGLE'S Language Model for Dialog Applications (LaMDA). Another non-limiting example of an LLM is GOOGLE'S multi-modal Gemini model. However, it should be noted that the LLMs described herein are one example of generative machine learning models and are not intended to be limiting.

The preceding is presented as an overview of only some implementations disclosed herein. These and other implementations are disclosed in additional detail herein.

BRIEF DESCRIPTION OF THE DRAWINGS

FIG. 3 depicts a flowchart that illustrates an example method of block 220 of FIG. 2.

FIG. 7 depicts a flowchart that illustrates an example method of generating a deadline bounded response to an input query.

DETAILED DESCRIPTION

Figure 1:
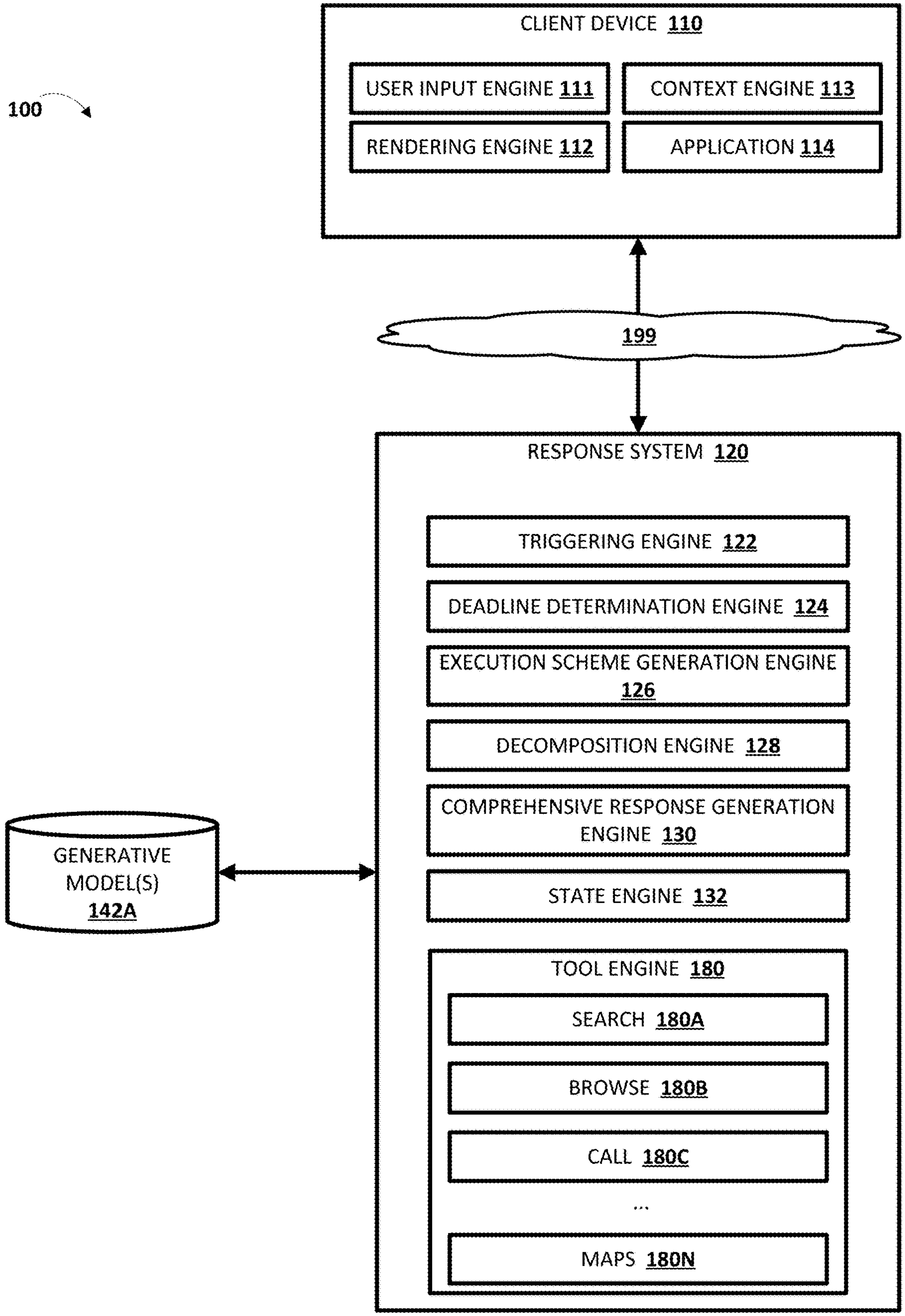
FIG. 1 depicts a block diagram of an example environment that demonstrates various aspects of the present disclosure, and in which some implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a client device 110 and a response system 120 (which might otherwise be referred to as a generative model (GM) based response system).

In various implementations, the client device 110 can include a user input engine 111 that is configured to detect user input that is provided by a user of the client device 110 using one or more user interface input devices and that can be included as part of an input query provided to the response system 120. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110. Some instances of input data described herein can be input data that is formulated based on user input provided by a user of the client device 110 and detected via user input engine 111. For example, a query can be typed via a physical or virtual keyboard, a suggested query that is selected via a touch screen or a mouse, a spoken voice query that is detected via microphone(s) of the client device, or an image query that is based on an image captured by a vision component of the client device or an image stored in a memory of the client device.

In various implementations, the client device 110 can include a rendering engine 112 that is configured to provide content (e.g., generative content including comprehensive responses and non-comprehensive responses, various prompts, and/or other outputs from the response system 120) for audible and/or visual presentation to a user of the client device 110 using one or more user interface output devices. For example, the client device 110 can be equipped with one or more speakers that enable content to be provided for audible presentation to the user via the client device 110. Additionally, or alternatively, the client device 110 can be equipped with a display or projector that enables content to be provided for visual presentation to the user via the client device 110.

In various implementations, the client device 110 can include a context engine 113 that is configured to determine a context (e.g., current or recent context) of the client device 110 and/or of a user of the client device 110. In some of those implementations, the context engine 113 can determine a context utilizing current or recent interaction(s) via the client device 110, a location of the client device 110, profile data of a profile of a user of the client device 110 (e.g., an active user when multiple profiles are associated with the client device 110), and/or other data accessible to the context engine 113. For example, the context engine 113 can determine a current context based on a current state of a query session (e.g., considering one or more recent queries of the query session), profile data, and/or a current location of the client device 110. For instance, the context engine 113 can determine a current context of "looking for a healthy lunch restaurant in Louisville, Kentucky" based on a recently issued query, profile data, and a location of the client device 110. As another example, the context engine 113 can determine a current context based on which application is active in the foreground of the client device 110, a current or recent state of the active application, and/or content currently or recently rendered by the active application. A context determined by the context engine 113 can be utilized, for example, in supplementing or rewriting a query that is formulated based on user input.

The client device 110 can execute one or more applications, such as application 114, via which input data can be provided and/or selected, and/or other response(s) to the input data can be rendered (e.g., audibly and/or visually). The application 114 can be an application that is separate from an operating system of the client device 110 (e.g., one installed "on top" of the operating system)—or can alternatively be implemented directly by the operating system of the client device 110. For example, the application 114 can be a web browser installed on top of the operating system, or can be an application that is integrated as part of the operating system functionality. The application 114 can interact with the generative model-based response system 120.

Although illustrated separately from client device 110 and coupled with client device via network(s) 199, in some implementations all or aspects of response system 120 can be implemented on the client device 110, optionally as part of a cohesive system with one or more of engines 122, 124, 126, 130, 132, and 180. In additional or alternative implementations, all or aspects of the response system 120 can be implemented remotely from the client device 110 as depicted in FIG. 1 (e.g., at remote server(s)). In those implementations, the client device 110 and the response system 120 can be communicatively coupled with each other network(s) 199, such as one or more wired or wireless local area networks ("LANs," including Wi-Fi LANs, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

Further, the client device 110 and/or the response system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

Response system 120 is illustrated as including a triggering engine 122, a deadline determination engine 124, an execution scheme generation engine 126, a decomposition engine 128, a comprehensive response generation engine 130, a state engine 132, and a tool engine 180. The engines can each interface with one or more generative models 142A, which can be included as part of the response system 120 and/or communicatively coupled with the response system 120 (e.g., accessible via application programming interface(s)). Some of the engines can be omitted in various implementations. In some implementations, the engines of the response system 120 are distributed across one or more computing systems.

The triggering engine 122 can be configured to determine whether to generate an execution scheme for generating a comprehensive response for a received input query. In some implementations, the triggering engine 122 can perform one or more aspects of block 220 of FIG. 2 (described below) and/or method 300 of FIG. 3 (described below).

The deadline determination engine 124 can be configured to determine a deadline for providing a comprehensive response for a received input query. In some implementations, the deadline determination engine 124 can perform one or more aspects of block 232 of FIG. 2 (described below), and/or method 400 of FIG. 4 (described below).

The execution scheme generation engine 126 can be configured to generate an execution scheme to provide a comprehensive response responsive to the received input query before a determined deadline. In some implementations, the execution scheme generation engine 126 can perform one or more aspects of block 230 of FIG. 2 (described below).

The decomposition engine 128 can be configured to decompose an input query into sub-queries and corresponding tools. In some implementations, the decomposition engine 128 can perform one or more aspects of block 234 of FIG. 2 (described below).

The comprehensive response generation engine 130 can be configured to process the execution scheme, and generate a comprehensive response, for a received input query, based on corresponding sub-query responses generated by the tool engine 180 during processing of the execution scheme. In some implementations, the comprehensive response generation engine 130 can perform one or more aspects of blocks 240, 260, 270, and 272 of FIG. 2 (described below) and/or method 500 of FIG. 5 (described below).

The state engine 132 can be configured to determine, maintain and/or provide a state of the processing of the execution scheme. In some implementations, the state engine 132 can perform one or more aspects of blocks 530 and 532 of FIG. 5 (described below).

The tool engine 180 can be configured to cause sub-query responses to be generated for corresponding sub-queries and utilizing one or more corresponding tools, such as search tool 180A, browse tool 180B, call tool 180C, maps tool 180N, and/or other tool(s) (e.g. indicated by the ellipsis). In some implementations, the tool engine 180 can perform one or more aspects of block 524 of FIG. 5 (described below).

Figure 2:
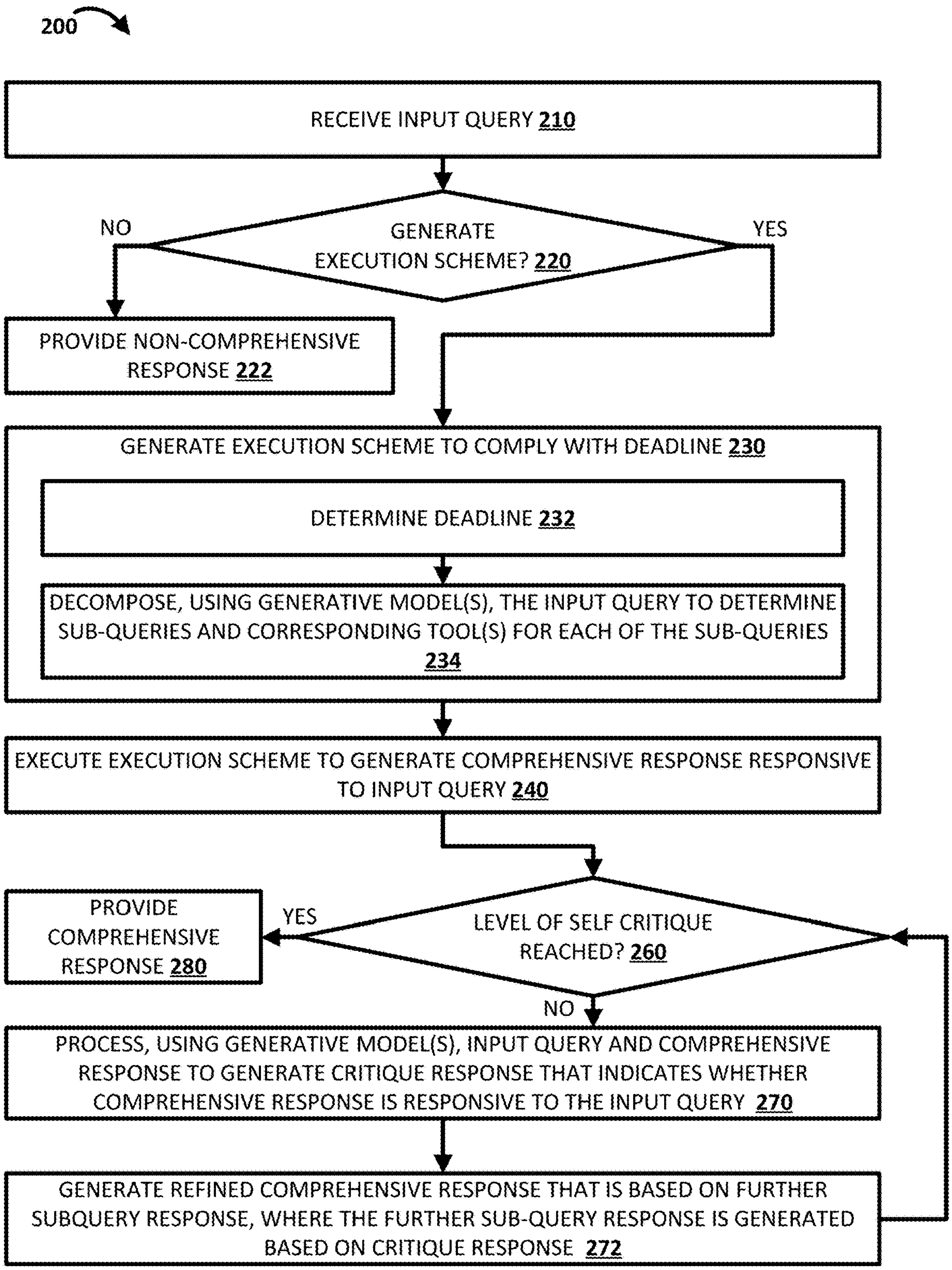
FIG. 2 depicts a flowchart that illustrates various operations for generating a deadline bounded response to an input query, according to implementations described herein.

Turning now to FIG. 2, a flowchart that illustrates various operations 200 for generating a deadline bounded response to an input query, according to implementations described herein, is depicted. For convenience, the operations 200 are described with reference to a system that performs the operations 200. This system includes one or more processors, memory, and/or other component(s) of computing device(s) (e.g., the response system 120 of FIG. 1). Moreover, while operations 200 are shown in a particular order, this is not meant to be limiting. One or more operations 200 may be reordered, omitted, and/or added.

At block 210, the system receives an input query. The input query can be one formulated based on user interface input at a client device, such as typed input, voice input, input to cause an image to be captured or selected, etc. In some implementations, when the input includes content that is not in textual format, the system can convert the query to a textual format or other format. For example, if the user interface input is a voice query the system can perform automatic speech recognition (ASR) to convert the voice query into textual format.

In some implementations, in addition to including content that is based on user interface input at a client device, the input query of block 210 can include additional content that is based on measured and/or inferred feature(s) of the client device and/or the user. For example, the input query can include additional content that describes a location of the client device and/or additional content that describes explicit or inferred preferences of the user. For instance, the input query can include natural language text, that is provided by the client device along with the content that is based on the user interface input, and that describes a neighborhood, a city, and/or a state in which the client device is located.

In some situations, the user input query can include an explicit or implicit deadline by which a response is required. As one example, the user input query can include a time-bounded deadline. For instance, the user input query can include the text "give me some options for a vacation, I need them in 30 minutes", whereby the time-bounded deadline is 30 minutes. As another example, the user input query can include an event-bounded deadline. For instance, the user input query can include the text "write a document before my meeting with Victor tomorrow". Based on, for instance, a calendar event associated with the user indicating that the user has a meeting with Victor the next day at 2 PM, a corresponding event-bounded deadline can be inferred. As another example, the user input query can include an implied deadline. For instance, the user input query can include the text "How do you make a Tiramisu?". In this case, a even though the user input query does not specify any particular deadline, a deadline may still be inferred from the input query or other context data, such as the user's location (e.g., based on the user being located in or near a grocery store), a time of day (e.g., based on the time approaching a time the user usually eats dinner), etc. In other situations, the user input query may not include a deadline either explicitly or implicitly, yet it still may be beneficial to generate an execution scheme to comply with a deadline by which to provide a comprehensive response.

At block 220, the system determines whether to generate and/or process an execution scheme to comply with a deadline for generating a comprehensive response to the input query. For example, the system can determine whether to generate and/or process an execution scheme or to instead provide a non-comprehensive response to the input query. This can, for instance, be based on an analysis of the input query to determine if there is a specified deadline, or if responding to the input query would benefit from longer running processing. In some implementations, block 220 can include one or more aspects of method 300 of FIG. 3.

If, at block 220, the system determines to not generate and/or process an execution scheme, the system proceeds to block 222 and provides a non-comprehensive response responsive to the input query. That is, the system proceeds to block 222 and causes a non-comprehensive response to be rendered at the client device responsive to the input query, and without performing one or more further blocks of method 200. As one example, the non-comprehensive response of block 222 can be generated based on processing the input query utilizing an GM and without any processing, utilizing the GM and along with the input query, of any content generated based on any generated sub-queries and/or utilizing any tool(s). As another example, the non-comprehensive response of block 222 can be generated based on processing the input query utilizing an GM and processing, utilizing the GM and along with the input query, content generated based on utilizing only a single tool.

Accordingly, block 222 is performed for at least some input queries when it is determined, based on one or more objective criteria (e.g., one or more of those described in FIG. 3), that a non-comprehensive response should be provided in lieu of generating and processing an execution scheme to provide a comprehensive response. In these and other manners, non-comprehensive responses, which can be generated with greater computational efficiency and less latency, are at least selectively provided. However, according to method 200 and as described herein, execution schemes to provide comprehensive responses are generated and processed, and comprehensive responses are accordingly generated and provided for at least some input queries. Further, generating and processing execution schemes to provide comprehensive responses, while requiring more computational resources and increased latency to perform relative to generating and providing their non-comprehensive counterparts, can achieve various client device efficiencies as described herein.

If, at block 220, the system determines to generate and/or process an execution scheme, the system proceeds to block 230. At block 230, the system generates an execution scheme to comply with a deadline for generating a comprehensive response which is responsive to the input query. The execution scheme can be used to coordinate the order and timing of processing of each of a plurality of sub-queries decomposed from the input query, as well as one or more corresponding tool(s) to be utilized to process each sub-query. Block 230 can include blocks 232 and 234.

In some implementations, the execution scheme can be generated to specify which and how many tools are utilized. As described herein, some tools may be more expensive than others in terms of computational resource consumption and/or time to execute, so the decision as to which and how many tools can influence the estimated execution time for the execution scheme (e.g., and can therefore be based on the deadline). Furthermore, in some implementations, the execution scheme can be generated to specify the degree of tool use of one or more included tools. Some tools (e.g. searching, fetching a webpage) can require multiple iterative calls. As such, the decision as to the degree of tool use (e.g., the number of queries submitted) specified by the execution scheme can also be a factor as to the estimated execution time for the execution scheme (e.g., and can therefore be based on the deadline).

In some implementations, the execution scheme can be generated to specify how much context is maintained during the processing of the execution scheme and/or provided to the GM(s) when generating the comprehensive response (e.g., based on the deadline). For instance, the execution scheme can specify that only snippets extracted from tool use outputs are to included in the sub-query responses and/or to be used to generate the comprehensive response, that the full tool use outputs are to be included in the sub-query responses and/or are to be used to generate the comprehensive response, etc. Using more context comes at a higher computational cost and latency (e.g., and therefore higher estimated execution time) but allows the comprehensive response to be generated based on greater information.

In some implementations, the execution scheme can be generated to specify which GM is to be utilized for generating the comprehensive response (e.g., based on the deadline). For instance, multiple GMs may be available, each of which having a different size or architecture, and therefore being associated with a different estimated execution time. As an example, if a longer deadline is set, the execution scheme can be generated to specify that a larger, more expensive GM can be used for generating the comprehensive response.

In some implementations, the execution scheme can be generated to specify a level of self critique (e.g., based on the deadline). Self critique can refer to a process in which GM output (e.g., corresponding to the comprehensive response that is responsive to an input query) can be evaluated based on processing, by a GM (e.g., the GM used to generate the GM output), the GM output. Based on the processing, further GM output can be generated, corresponding to a critique response. The further GM output can be generated to include, for instance, one or more token(s) which can be processed to evaluate the initial GM output (e.g., the token(s) can indicate that the comprehensive response is or is not responsive to the input query). For instance, when a longer deadline is set, the execution scheme can be generated to specify a higher level of self-critique. This can lead to a comprehensive response which is more likely to be responsive to the input query, at the expense of more computation (e.g., and thus a greater estimated execution time).

Similarly, the execution scheme can be generated to specify a level of self consistency (e.g., based on the deadline). Self consistency can refer to a process in which GM output corresponding to multiple decoding paths (e.g., corresponding to multiple comprehensive responses, each corresponding to a different reasoning chain) can be generated. One of the decoding paths (e.g., corresponding to one of the comprehensive responses) can then be selected, for instance, based on the most consistent result (e.g., the comprehensive response which is most consistent with the generated comprehensive responses). The specified level of self consistency can correspond to the number of decoding paths to be generated. For instance, when a longer deadline is set, the execution scheme can be generated to specify a higher level of self consistency, thereby exploring more reasoning paths and aggregating over those reasoning paths. This can lead to a comprehensive response which is more likely to be responsive to the input query, at the expense of more computation (e.g., and thus a greater estimated execution time).

In some implementations, the execution scheme can be generated to specify when one or more sub-queries should be processed and/or when the comprehensive response should be generated. For instance, processing at some times of the day can be more expensive than others. As such, it may be useful to defer processing to a quiet period where there is lower system load.

At block 232, the system determines a deadline for generating a comprehensive response which is responsive to the input query. This can be performed in any suitable manner. As one example, the input query can include an explicit or implicit deadline, which can be identified as a result of analysis of the input query (e.g., as an initial step which can actually be performed prior to block 220 and/or block 230, as part of block 234, etc.,). As another example, the deadline can be determined as a result of subsequent user input (e.g., responsive to a prompt for a deadline, responsive to information characterizing one or more candidate execution schemes being rendered, etc.). In some implementations, information identified that is indicative of a deadline can be mapped to a relative deadline. For instance, assuming input text is received that includes "Thursday next week", or "before the show tomorrow", such information can be mapped to a remaining amount of time until the deadline (e.g., 17 hours from now). In some implementations, block 232 can include one or more aspects of method 400 of FIG. 4.

At block 234, the system decomposes, using generative model(s), the input query to determine sub-queries, corresponding tool(s) for each of the sub-queries, and ultimately the execution scheme to comply with the deadline based on the sub-queries and corresponding tools. In some implementations, the system processes the input query using one or more generative models to determine the sub-queries, corresponding tool(s) for each of the sub-queries, and ultimately the execution scheme. For example, the system can process the input query using a GM (e.g., an LLM) that is fine-tuned based on sub-query generation data, tool use data and/or execution scheme generation data. Also, for example, the system can process a prompt, that includes the input query and additional prompt text, using a GM (e.g., an LLM) that is optionally fine-tuned based on sub-query generation data, tool use data and/or execution scheme generation data. For instance, the additional prompt text can include few shot example(s) of a query and corresponding sub-queries, tools, and/or execution schemes, and/or can include instructional text such as: "given [input query] and [deadline], provide an execution scheme that coordinates processing of a list of sub-queries and corresponding tool(s) to provide a response to [input query] by the deadline. To provide the execution scheme: create the list of sub-queries that would need to be taken to enable completion of one or more goals specified in [input query]. For each of the sub-queries, and given [tool descriptions] specify, which tool(s) should be utilized to generate a response for the [sub-query] and, if needed, modify the sub-query to be dependent on one or more responses from one or more other of the other sub-queries. Ensure that the estimated execution time of the sub-queries, based on the tools included and the use thereof, does not exceed the time remaining before the deadline. Optionally, also include in the execution scheme whilst still complying with the deadline: 1) how much context to maintain, 2) a selected GM to be used, 3) a level of self critique, and 4) for each of the sub-queries, an indication of whether the sub-query can be deferred.". The sub-queries, corresponding tool(s) for each of the sub-queries, and ultimately the execution scheme can be determined based on GM output generated by such processing. It will be appreciated that, although it has been described herein that determining the sub-queries, corresponding tool(s) for each of the sub-queries, and ultimately the execution scheme is performed in a single inference, in some implementations, these determinations can instead be performed over multiple inferences (e.g., two inferences based on any combination of the three determinations, three separate inferences corresponding to the each individual determination, or more).

Each sub-query (or corresponding tool) can be associated with an estimated execution time (e.g., an estimated time taken to process the sub-query to determine corresponding sub-query response(s)). For example, processing of a sub-query using a "browse" tool can, for at least some queries, take multiple seconds to complete. As another example, processing of a "call" tool can take minute(s) to complete, and may take hour(s) before it can be initiated (e.g., during open hour(s) for a corresponding business). As such, an execution scheme can also be associated with an estimated execution time, based at least in part on the estimated execution times of each of the sub-queries for that execution scheme. Depending on the sub-queries and/or tools, it can be estimated that the execution scheme can take seconds, minutes, hours, or even day(s) to fully complete. Further, dependencies of sub-queries to other sub-queries can impact the time duration for completion. Yet further, in various implementations, the execution scheme can cause the system to purposefully delay processing of one or more sub-queries so that such processing occurs during estimated or measured periods of lesser server load and/or periods of more abundant energy availability.

As a working example, assume the input query is "Plan me a day out in London before my vacation. I am staying at Hotel X". A first execution scheme associated with a relatively short estimated execution time (e.g., a few seconds) that might be generated can therefore include the generated sub-queries and corresponding tools of: a first sub-query of "restaurants in London" and a tool of "search"; and a second sub-query of "landmarks in London", and a tool of "search". A second execution scheme associated with a slightly longer estimated execution time (e.g., a few hours) that might be generated can additionally include the generated sub-queries and corresponding tools of: a third sub-query of "opening times and menu options, for [restaurant from response to first sub-query]" and a tool of "browse"; a fourth sub-query of "opening times and ticket prices, for [landmark from response to second sub-query]" a fifth sub-query of "find the nearest suitable restaurant from hotel X from [restaurants from response to first sub-query]" and a tool of "maps". A third execution scheme associated with a much longer estimated execution time (e.g., a few days) that might be generated can additionally include the generated sub-queries and corresponding tools of: a sixth sub-query of "call [restaurant from response to fifth sub-query] to book a table" and a tool of "call"; a seventh sub-query of "call [landmark from response to second sub-query] to book tickets", and a tool of "call"; an eighth sub-query of "call [contact from contact list based in London] to arrange a meeting", and a tool of "call", etc.

In this example, the tool of "search" can be an automated search tool that performs an internet search based on the sub-query and returns content (e.g., relevant snippet(s) of) from one or more of the top search results from the search. Accordingly, processing the first sub-query using the search tool can result in a sub-query response that includes snippet(s) that specify restaurants in London and details for those restaurants. Similarly, processing the second sub-query using the search tool can result in a sub-query response that includes snippet(s) that specify landmarks in London and details for those landmarks.

Further, in this example the tool of "browse" can be an automated browsing tool that automatically browses a specified website in accordance with a specified sub-query, or searches for and browses website(s) in accordance with a specified sub-query. Accordingly, processing the third sub-query (which is conditioned on the sub-query response for the first sub-query) using the tool of "browser" can cause searching for websites for each of the restaurants of the sub-query response for the first sub-query, and browsing those websites (including optionally interacting with element(s) on those website(s)) to determine, for each of the restaurants, corresponding opening time(s) and corresponding menu option(s). The opening time(s) and corresponding menu option(s), for each of the restaurants of the sub-query response for the first sub-query, can be the sub-query response for the third sub-query. Similarly, processing the fourth sub-query (which is conditioned on the sub-query response for the second sub-query) using the tool of "browser" can cause searching for websites for each of the landmarks of the sub-query response for the second sub-query, and browsing those websites (including optionally interacting with element(s) on those website(s)) to determine, for each of the landmarks, corresponding opening time(s) and corresponding ticket price(s). The opening time(s) and ticket price(s), for each of the landmarks of the sub-query response for the second sub-query, can be the sub-query response for the fourth sub-query.

Yet further, in this example the tool of "maps" can interact with a mapping system's application programming interface (API) to obtain map-based result(s) and/or route information for a specified sub-query. Accordingly, a sub-query response for the fifth sub-query can include results, from the mapping system, for the fifth sub-query of "find the closest restaurant to hotel X from [restaurants from response to first sub-query]".

The tool of "call" can utilize automated calling technology, such as GOOGLE'S DUPLEX technology to place a corresponding automated call that is in accordance with the sixth, seventh and eighth sub-queries. The sixth sub-query is conditional on the sub-query response for the fifth sub-query, which can cause calls to be placed to the restaurant indicated in the sub-query response for the fifth sub-query to inquire about booking a table. The sub-query response for the sixth query can be based on the responses to the inquiries about booking a table provided in the one or more call(s). Similarly, the seventh sub-query can cause calls to be placed to the landmarks indicated in the sub-query response for the second sub-query to inquire about booking tickets. The sub-query response for the seventh sub-query can be based on the responses to the inquiries about booking tickets provided in the various calls. Moreover, the eighth sub-query can cause calls to be placed to contacts from the users contact list that are known to be based in London to inquire about arranging a meeting. The sub-query response for the eighth sub-query can be based on the responses to the inquiries about arranging a meeting provided in the various calls.

In some implementations, the estimated execution times can be determined based on generative model output (e.g., as part of the decomposition of block 234 and included in the execution scheme accordingly). For instance, one or more token(s) included in the generative model output provided during the decomposition pass and/or the tool determination pass, can be processed to determine an estimated execution time. Additionally or alternatively the estimated execution times can be determined, for instance, based on the tool(s) of the sub-queries and/or the extent of usage of the tool(s). For instance, each tool and/or each action associated with a tool can be associated with a corresponding estimated execution time. The execution scheme can then be processed (e.g., using a GM, an execution time estimation model, a lookup table, etc.,) to determine, for each sub-query, an estimated execution time, as well as a total estimated execution time.

The execution scheme can thus be generated such that it complies with the deadline. More specifically, at block 230, the system can generate an execution scheme that will provide a comprehensive response that is responsive to the input query, and that is associated with a total estimated execution time that is less than or equal to the remaining time before the deadline.

As one example, assuming the deadline is known at block 234, the deadline can be used as an additional signal to influence the generation of the execution scheme. For example, the system can process the input query and the deadline using a GM (e.g., an LLM) that is fine-tuned based on input queries, execution schemes, and estimated and/or actual execution time data. Also, for example, the system can process a prompt that includes the input query and the deadline, along with additional prompt text, using a GM (e.g., an LLM) that is optionally fine-tuned based on based on input queries, execution schemes, and estimated and/or actual execution time data. For instance, the additional prompt text can include few shot example(s) of input queries and execution schemes and corresponding estimated execution times (e.g., of the execution scheme and/or of each sub-queries or tool(s) thereof) and/or instructional text such as "Given [input query] and [deadline] create an execution scheme that includes a list of steps that would need to be taken to enable completion of one or more goals specified in [input query]. Ensure that the execution scheme can be completed before [deadline]". The execution scheme can then be determined based on the resulting GM output.

As another example, a plurality of candidate execution schemes can be generated (e.g., without use of the deadline to influence the generation of the candidate execution schemes). Each of the candidate execution schemes can be generated in much the same way as described in relation to generation of the execution scheme. For instance, the plurality of execution schemes can be generated as a result of performing block 234 a plurality of times. Furthermore, each candidate execution scheme can include a plurality of sub-queries, each associated with one or more tools. Each candidate execution scheme can also be associated with an estimated execution time (e.g., based at least in part on a total of the estimated execution times for each sub-query of that candidate execution scheme, similarly to as described in relation to the execution scheme). Since generative models are non-deterministic, it can be expected that the candidate execution schemes will differ from one another in at least one aspect, and therefore the estimated execution times for the candidate execution schemes will differ. Additionally or alternatively, different candidate deadlines can be used to influence the generation of corresponding candidate execution schemes to ensure that there is diversity in the candidate execution schemes and associated estimated execution times. For instance, for each candidate execution scheme, the system can process a prompt that includes the input query and the corresponding candidate deadline, along with any additional prompt text, using a GM. One of the candidate execution schemes can then be selected as the execution scheme to be proceeded with (e.g., to be processed or, in other words, executed, at block 240).

As one example, the selection of the candidate execution scheme as the execution scheme can be based on a determined deadline (which can be determined in any suitable manner, including those described herein). For instance, the system can compare the estimated execution times of the candidate execution schemes against the determined deadline. The system can then select one of the candidate execution schemes which is associated with an estimated execution time that is less than or equal to the time remaining before the deadline. In some implementations, the system can select the candidate execution scheme which is associated with an estimated execution time that is the largest of the estimated execution times of the candidate execution schemes that are less than or equal to the time remaining before the deadline (e.g., to ensure that available time remaining before the deadline is maximally used). As another example, the system can select one of the candidate execution schemes based on user interface input. For instance, the system can cause information characterizing the candidate execution schemes to be rendered at a client device (e.g., at least the estimated execution time of the candidate execution schemes). Then, responsive to determining that affirmative user interface input is received in relation to a given one of the candidate execution schemes (e.g., as a result of the user providing user interface input to select the given candidate execution scheme), the system can select the given candidate execution scheme as the execution scheme.

At block 240, the system executes (or in other words, processes) the execution scheme to generate the comprehensive response responsive to the input query, in accordance with the deadline. For instance, the system can, for each sub-query of the execution scheme, cause processing of the sub-query, using corresponding tool(s), to generate corresponding sub-query response(s). The comprehensive response can then be generated based on the sub-query responses. In some implementations and/or for some tools, the system can cause processing of a sub-query using a tool by providing the sub-query to the corresponding tool via an API of the tool. In some implementations, block 240 can include one or more aspects of method 500 of FIG. 5.

In various implementations, when a given sub-query is associated with one or more dependencies, the execution scheme can be generated such that the sub-queries are processed according to the dependencies. As an example, when a given sub-query is dependent on a sub-query response for a separate sub-query, the execution scheme can cause the system to, at block 240, await the sub-query response from the separate sub-query prior to causing the given sub-query to be processed using its corresponding tool(s) (or in other words, process the separate sub-query prior to the given sub-query). For instance, the given sub-query might include "Prepare a list of local restaurants that serve vegan food", and the separate sub-query might include "Contact local restaurants to inquire about the availability of vegan food", whereby the list cannot be prepared until the responses to the inquiries to the restaurants have been received. Further, the system can additionally refine the given sub-query, using the sub-query response on which it is dependent, prior to interacting with the tool(s) to cause processing of the sub-query (e.g., "Prepare a list of local restaurants that serve vegan food based on [responses to inquiries]"). As another example, when a given sub-query is dependent on an external event, the execution scheme can cause the system to, at block 240, await determining that the event has occurred prior to causing the given sub-query to be processed using its corresponding tool(s). For instance, the given sub-query might include "Once the information has been received from John, shorten it to 100 words or less and forward to the team". The system can therefore wait until it has been determined that the event "information has been received from John" before proceeding with processing the sub-query. More generally, the system can, at block 240, coordinate the order and timing of processing of each of the sub-queries, according to the execution scheme.

The system can then process, using one or more generative models, the sub-query responses to generate a comprehensive response. The one or more generative models can be the same as or distinct from those previously mentioned (e.g., for analyzing the input query, for decomposing the input query, for determining tools and/or estimated execution times, etc.). For example, the system can process the sub-query responses using a GM (e.g., an LLM) that is fine-tuned based on comprehensive response generation data. Also, for example, the system can process a prompt, that includes the sub-query responses and additional prompt text, using a GM (e.g., an LLM) that is optionally fine-tuned based on comprehensive response generation data. For instance, the additional prompt text can include few shot example(s) of sub-query responses and a corresponding comprehensive response and/or text such as "given [sub-query responses] create output that specifies a graphical user interface that conveys main components of the sub-query responses and that is organized in a logical manner". The comprehensive response can be determined based on GM output generated by such processing.

At block 260, the system determines whether the level of self critique specified by the execution scheme (or in other words, a threshold level of self critique) has been reached. The level of self critique can refer to the number of iterations of self-critique operations (e.g., blocks 270 and 272) that have been performed. If the execution scheme does not specify a level of self critique, a default number of iterations may be performed (e.g., none, thereby effectively bypassing blocks 260, 270, and 272, etc.).

If, at block 260, the system determines that the level of self critique specified by the execution scheme has not been reached (or in other words, that further iterations of self critique operations should be performed), the system can proceed to block 270.

At block 270, the system processes, using one or more generative models, the input query, the current comprehensive response, and optionally the sub-queries and/or the one or more corresponding tools of the sub-queries to generate a critique response that indicates whether the comprehensive response is responsive to the input query. For example, the critique response can be generated based on generative model output generated by such processing. The one or more generative models, utilized in block 270, can be the same as or distinct from those used in the preceding operations. For example, the system can process the input query and the comprehensive response using a GM (e.g., an LLM) that is fine-tuned based on critique response generation data. Also, for example, the system can process a prompt that includes the input query and the comprehensive response, along with additional prompt text, using a GM (e.g., an LLM) that is optionally fine-tuned based on critique response generation data. For instance, the additional prompt text can include few shot example(s) of input queries and comprehensive responses and a corresponding critique response and/or instructional text such as "is [comprehensive response] fully responsive to [input query]? If so, output 'responsive'. If not, output a description of why it is not fully responsive".

If the system determines, based on the critique response, that the comprehensive response is responsive to the input query, the current comprehensive response can be provided, and further self critique operations can be bypassed (in other words, the system can proceed to block 280 with the current comprehensive response). For example, where the system, at block 270, prompts the generative model to output "responsive" or other responsive token when the comprehensive response is responsive to the input query, the system can determine it is responsive when the responsive token is included in the critique response.

If the system determines, based on the critique response, that the comprehensive response is not responsive (e.g., following the example above, the responsive token is not included in the critique response), the system proceeds to block 272 and generates a refined comprehensive response that is based on a further sub-query response, where the further sub-query response is generated based on the critique response. For example, the critique response can directly indicate a further sub-query and further tool, or can be processed by the system, using a generative model, to determine a further sub-query and further tool. Further, the system can cause a further sub-query response to be generated, based on the further sub-query and the further tool, and generate the refined comprehensive response based on the further sub-query response. The system then returns to block 260, to determine whether the level of self critique specified by the execution scheme has now been reached.

If, at block 260, the system determines that the level of self critique specified by the execution scheme has been reached (or in other words, that no further iterations of self critique operations should be performed), the system proceeds to block 280 and provides the comprehensive response (which, in some cases, may be the latest refined comprehensive response). For example, the system can cause the comprehensive response to be rendered (e.g., audibly and/or visually) at a client device, such as the client device via which the user interface input of block 210 was received. Additionally or alternatively, the system can cause the comprehensive response to be rendered (e.g., audibly and/or visually) at another client device, such as a client device in communication with, or otherwise associated with, the client device via which the user interface input of block 210 was received. For instance, following the working example above, a comprehensive response to a user input query of "Plan me a day out in London before my vacation" entered at a client device of a user (e.g., a smart phone of a user) may be provided in the form of a navigation route. Accordingly, rather than being rendered at the smart phone of the user, the comprehensive response can be rendered at a client device of a vehicle of the user (e.g., via an infotainment system of the vehicle). The other client device can be determined to be associated with the client device based on, for instance, the client device being in communication with the other device, both the client device and the other device being associated with a user account of the user, the client device being determined to be physically co-located with the other client device (e.g., within a threshold distance, based on short range signals (e.g., audio signals, Bluetooth signals, etc.,) emitted from the client device being received by the other client device or vice versa, etc.,), etc. In some implementations, a push notification is provided to the client device and/or the other client device to inform a user of availability of the comprehensive response. For example, the push notification can be provided if an application for rendering the comprehensive response is not active and selection of the push notification can cause the application to be launched in a state that renders the comprehensive response.

FIG. 3 depicts a flowchart that illustrates an example method 300 of block 220 of FIG. 2.

At block 312, the system processes, using one or more GMs, a prompt that is based on the input query (e.g., and not on any sub-query responses) to generate a non-comprehensive response to the input query. For example, the non-comprehensive response can be determined based on GM output from such processing.

At block 314, the system determines, based on the non-comprehensive response, whether to generate and/or process an execution scheme. In some implementations, block 314 includes blocks 318, 320, and/or 322.

At block 316, the system determines whether to generate and/or process an execution scheme based on whether the non-comprehensive response includes token(s) indicating that an execution scheme should be generated and/or processed. For example, the GM(s), utilized in block 312 can be fine-tuned to cause, when an input query is appropriate for execution scheme generation and/or processing, generation of GM output that reflects token(s) that indicate that an execution scheme should be generated and/or processed. The system can be more likely to (or can always) generate and/or process an execution scheme when the non-comprehensive response includes token(s) indicating execution scheme generation and/or processing.

At block 318, the system determines whether to generate and/or process an execution scheme based on estimated execution times of one or more candidate execution schemes. For instance, in some implementations, the non-comprehensive response can include a plurality of candidate execution schemes, each associated with an estimated execution time (as described herein). The system can determine whether to generate and/or process an execution scheme based on whether at least one of the estimated execution times exceeds a threshold time (e.g., thereby implying that the input query is complex and would benefit from being processed according to an execution scheme).

At block 320, the system determines whether to generate and/or process an execution scheme based on processing, using one or more GM(s), the input query and the non-comprehensive response and, optionally, one or more sub-queries and/or corresponding tools generated based on the input query. For example, the system can process, using a GM, a prompt that is of the form "is the initial response to [input query] is [non-comprehensive response] fully responsive to [input query]? If so, output 'responsive'. If not, output 'not fully responsive'". The system can determine whether to generate and/or process an execution scheme based on GM output from such processing. For example, the system can be more likely to (or can always) generate and/or process an execution scheme if the GM output indicates "not fully responsive".

At block 322, the system determines whether to generate and/or process an execution scheme based on providing a prompt, at the client device, via which user interface input (on which the input query is based) is provided, and determine whether to generate and/or process an execution scheme based on the feedback to the prompt. In some implementations, the non-comprehensive response can also be provided. As one example, the system can cause a prompt that includes the text of "When would you like this completed by?". If the feedback to the prompt is "I don't mind" or "Now" (e.g., via selection of an interface element also caused to be rendered at the client device, or via entering natural language text), the system can determine not to generate and/or process an execution scheme. On the other hand, if the feedback indicates a deadline (e.g., "In two weeks", or "before the conference"), optionally exceeding a threshold deadline, the system can determine to generate and/or process an execution scheme. As another example, the system can cause selectable user interface elements corresponding to candidate execution schemes to be rendered at the client device, along with a user interface element corresponding to the non-comprehensive response. If the feedback to the prompt is a selection of the non-comprehensive response, the system can determine not to generate and/or process an execution scheme (e.g., implying that the user is satisfied with the non-comprehensive response and further processing is not necessary). On the other hand, if the feedback is a selection of one of the candidate execution schemes, the system can determine to generate and/or process an execution scheme (e.g., based on that candidate execution scheme).

Although a number of examples have been described, it will be appreciated that the system can determine whether or not to generate an execution scheme based on any number of factors, including those not necessarily requiring the generation of a non-comprehensive response. For instance, in some implementations, the fact that a deadline has been identified in the input query, or indeed has been determined in any other way, can be used to determine to generate and/or process an execution scheme.

Figure 4:
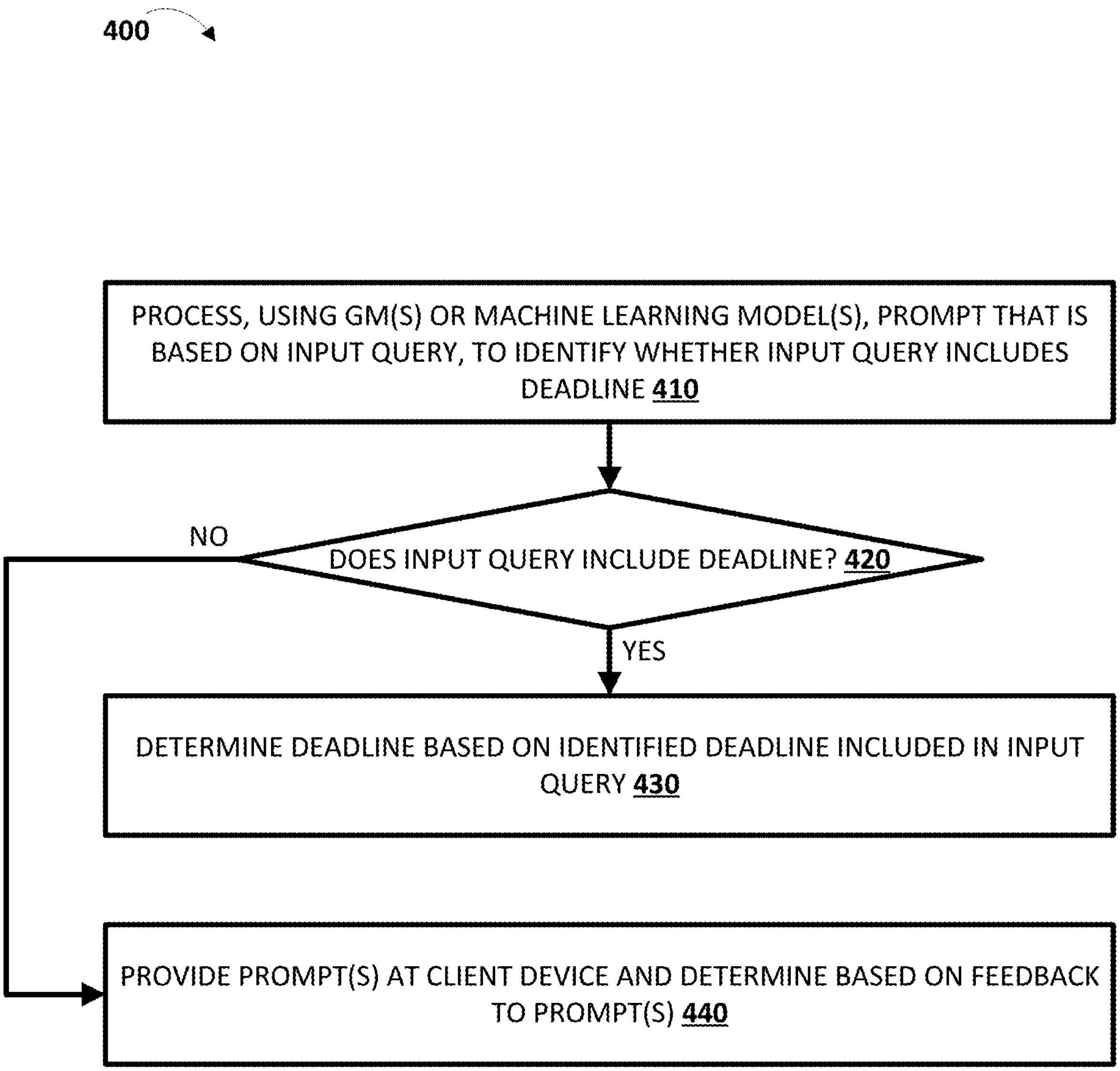
FIG. 4 depicts a flowchart that illustrates an example method of block 232 of FIG. 2.

FIG. 4 depicts a flowchart that illustrates an example method of block 232 of FIG. 2.

At block 410, the system identifies whether the input query includes a deadline based on processing, using one or more GM(s) or other machine learning models, a prompt that is based on the input query. For example, the system can process, using a GM, a prompt that is of the form "Does [input query] include a deadline by which a response is required. This may be implicit or explicit. If a deadline is specified, output: deadline identified, as well as the remaining time before the deadline. If a deadline is not specified, output: no deadline identified". The system can determine whether a deadline is identified in the input query (and if so, what the deadline is) based on GM output from such processing. In some implementations, this may be part of an initial analysis of the input query (e.g., performed prior to block 220 and/or block 230 of FIG. 2). In this way, this information can be used to determine whether or not to generate and/or process an execution scheme (e.g., in block 220 of FIG. 2) and/or to influence the generation of the execution scheme. Additionally or alternatively, this may be part of the decomposition processing of block 234 of FIG. 2 (e.g., by including additional instructional language in the prompt processed to decompose the input query). In this way, additional inference passes can be avoided. In some implementations, a machine learning model that has been trained to identify deadlines within input queries (e.g., based on training data including input queries containing deadlines, and the corresponding deadlines) can instead be used.

At block 420, the system determines whether the input query contains a deadline. If, at block 420, the system determines that the input query does contain a deadline (e.g., based on the output of block 410), the system proceeds to block 430. At block 430, the system determines the deadline based on the identified deadline included in the input query. If at block 420, the system determines that the input query does not include a deadline, the system proceeds to block 440.

At block 440, the system causes one or more prompt(s) to be rendered at the client device, and determines the deadline based on feedback to the prompt(s). In some implementations, the prompt can include a summary of the processing that could be performed in various different time scales. As one example, the system can cause a prompt that includes the text "When do you need this to be completed? If you can wait a few hours then I can do a more comprehensive study on the papers on this topic. If you need it immediately, I will just read through a few of the main surveys and base my answer on that". The feedback to the prompt (e.g., "5 minutes", "4 hours") can then be used to determine the deadline. In some implementations, the prompt can be rendered prior to blocks 220 (e.g., to provide additional information useful for determining whether to generate and/or process an execution scheme) and/or block 234 (e.g., to provide additional information to influence the decomposition and generation of the execution scheme and/or to select a candidate execution scheme). For instance, the prompt can be rendered responsive to determining that the input query does not contain a deadline and/or responsive to a positive determination at block 220. As another example, the system can cause prompts corresponding to candidate execution schemes that have been generated (e.g., as described herein). For instance, the prompts can include at least an estimated execution time associated with the corresponding candidate execution scheme. The feedback to the prompts (e.g., indicative of a selection of one of the candidate execution schemes) can then be used to determine the deadline. For instance, the estimated execution time of the selected candidate execution scheme can be determined to be the deadline.

Figure 5:
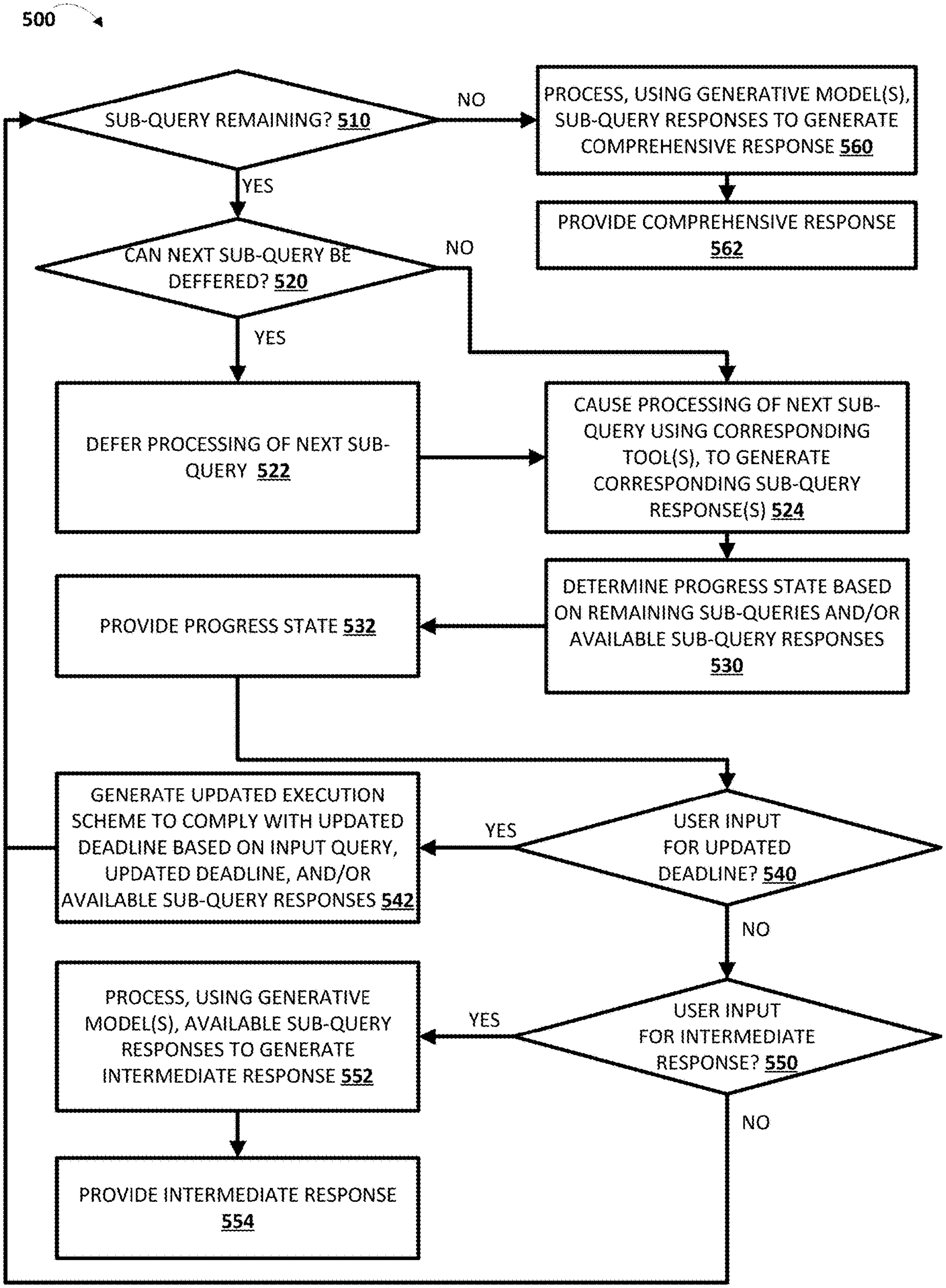
FIG. 5 depicts a flowchart that illustrates an example method of block 240 of FIG. 2.

FIG. 5 depicts a flowchart that illustrates an example method 500 of block 240 of FIG. 2. One or more operations may be reordered, omitted, and/or added.

At block 510, the system determines whether there are any remaining sub-queries of the execution scheme to be processed. If at block 510, the system determines that there is (at least one) remaining sub-query to be processed, the system proceeds to block 520.

At block 520, the system determines whether the next sub-query to be processed can be deferred. In some implementations, the execution scheme can indicate whether or not the sub-query can be deferred. For instance, generating the execution scheme can include (e.g., during any inference pass performed during the generation of the execution scheme) including one or more token(s) in the corresponding GM output that can be processed to determine whether the sub-query can be deferred. In some implementations, it can be determined, based on the dependencies of the sub-query and/or the other remaining sub-queries, whether the sub-query can be deferred. For instance, if it is determined that no remaining sub-query is dependent on processing of the next sub-query, it may be determined that the sub-query can be safely deferred. In some implementations, determining whether the sub-query can be deferred can be based on determining whether the deadline will be missed if the sub-query is deferred. For instance, if it is determined that the estimated execution time of the sub-query (as well as the estimated execution time of any remaining sub-queries dependent on the processing of the sub-query) does not exceed the remaining time before the deadline, it can be determined that the sub-query can be deferred. Furthermore, in some implementations, processing of a sub-query that is to be retrieved can be deferred based on determining that the sub-query is dependent on retrieved information. For instance, it may be determined that it would be beneficial to retrieve the information as late as possible. This can ensure that the information is as up to date as possible when the sub-query is processed.

If, at block 520, the system determines that the next sub-query can be deferred, the system proceeds to block 522, where the system defers processing of the next sub-query. In some implementations, the system can defer the processing of the next sub-query to estimated or measured periods of lesser server load and/or periods of more abundant energy availability. For instance, the system can monitor whether such periods have commenced. Responsive to determining that such periods have commenced, the system can proceed with processing the next sub-query. In this way, the execution scheme can coordinate and order the timing of the processing of each sub-query to maximize efficiency whilst still complying with the deadline. After the deferring has expired (e.g., when a period of lesser server load has commenced), the system proceeds to block 524.

If, at block 520, the system determines that the next sub-query cannot be deferred, the system proceeds to block 524.

At block 524, the system causes processing of the next sub-query using corresponding tools, to generate one or more corresponding sub-query response(s) (as described herein).

At block 530, the system determines a progress state based on any remaining sub-queries and/or available sub-query responses. For instance, the progress state can include, for each of the remaining sub-queries, an estimated execution time, a total remaining estimated execution time, a completion percentage, etc. Additionally or alternatively, the progress state can include the output of the most recently processed sub-query (or the tool(s) thereof), a selection of the processed sub-queries (or the tools thereof), each of the processed sub-queries (or the tools thereof), etc. In some implementations, the degree of the tool output maintained in the progress state (e.g., full tool output, snippets of tool output, etc.,) can be specified by the execution scheme.

At block 532, the system provides the progress state to the client device (or another client device associated with the client device). For instance, the system can cause the progress state to be rendered at the client device (or another client device). In this way, the user can be informed as to the progress of the execution scheme to complete the task set out in the input query.

At block 540, the system determines whether user interface input has been received that is indicative of an updated deadline. For instance, a subsequent natural language user input can be received (e.g., typed by the user, spoken by the user) which contains an implicit or explicit deadline, which differs from the previously determined deadline. The updated deadline can be identified in any suitable manner, including those described herein in relation to determining the original deadline. If, at block 540, it is determined that user interface input has been received that is indicative of an updated deadline, the system proceeds to block 542.

At block 542, the system generates an updated execution scheme to comply with the updated deadline to provide a comprehensive response which is responsive to the input query. The updated execution scheme can be determined based on the input query and the updated deadline in any suitable manner, including those described herein in relation to generating an execution scheme. Furthermore, the updated execution scheme and/or the comprehensive response can be determined based on the available sub-query responses, such that the processing already performed is not wasted. The system can then proceed with the updated execution scheme, and return to block 510.

At block 550, the system determines whether user interface input is received that is indicative of a request for an intermediate response. For instance, a subsequent natural language user input can be received (e.g., typed by the user, spoken by the user), which is indicative of a request for an intermediate response (e.g., "Where are we with the report", or "I need the report now"). Alternatively, selection of a corresponding selectable user interface (e.g., including the text "Progress update", or "Cancel") can be detected.

If, at block 550, the system determines that user interface input that is indicative of a request for an intermediate response has been received, the system can proceed to block 552. At block 552, the system can process, using one or more generative model(s) the available sub-query responses to generate an intermediate response. This can be performed in much the same way as described in relation to generating the comprehensive response based on the sub-query responses (e.g., in relation to block 240 of FIG. 2). However, in this case, since not all of the sub-queries have been processed, only the available sub-query-responses can be used to generate the intermediate response.

For instance, the system can then process, using one or more generative models, the available sub-query responses to generate an intermediate response. The one or more generative models can be the same as or distinct from those previously mentioned (e.g., for analyzing the input query, for decomposing the input query, for determining tools and/or estimated execution times, for generating the comprehensive response, etc.). For example, the system can process the available sub-query responses using a GM (e.g., an LLM) that is fine-tuned based on intermediate and/or comprehensive response generation data. Also, for example, the system can process a prompt, that includes the available sub-query responses and additional prompt text, using a GM (e.g., an LLM) that is optionally fine-tuned based on intermediate and/or comprehensive response generation data. For instance, the additional prompt text can include few shot example(s) of sub-queries and a corresponding intermediate and/or comprehensive response and/or text such as "summarize the current progress of [execution scheme] based on the [progress state]. In addition, given [available sub-query responses] create an output that specifies a graphical user interface that conveys main components of the sub-query responses determined so far, and that is organized in a logical manner". The intermediate response can be determined based on GM output generated by such processing.

At block 554, the intermediate response can be provided to the client device (or another client device associated with the client device). This can be performed in much the same way as described in relation to providing the comprehensive response in block 280 of FIG. 2. However, rather than the comprehensive response being provided for rendering at the client device (or another client device), in this case, the intermediate response is provided for rendering at the client device (or another client device). In some cases, further processing of the execution scheme can be ceased (e.g., when the user interface input requests that the task is cancelled, or concluded immediately). In other cases, the execution scheme can continue to be processed (e.g., the system can return to block 510).

If, at block 550, the system determines that user interface input that is indicative of a request for an intermediate response has not been received, the system returns to block 510, where it can be determined whether there are any further sub-queries remaining to be processed. It will be appreciated that whilst blocks 540 and 550 are shown as single decision blocks, in some implementations, the system can continuously monitor for and detect subsequent user interface input, at any time. Furthermore, in some implementations, the system can automatically determine to generate an updated execution scheme (e.g., by proceeding to block 542) and/or determine an intermediate response (e.g., by proceeding to block 552), without user interface input being detected. For instance, when the system determines that the remaining estimated execution time exceeds the deadline (e.g., based on the progress state), the system can determine to update the execution scheme such that the updated execution scheme complies with the deadline and/or generate and provide an intermediate response (e.g., when the deadline is imminent). This may occur, for instance, when one of the sub-queries takes longer to process than the estimated execution time, or when a dependency of one of the sub-queries takes longer to be satisfied than expected.

If at block 510, the system determines that there are no remaining sub-queries to process (or in other words, all of the sub-queries of the execution scheme have been processed), the system proceeds to block 560.

At block 560, the system processes, using one or more generative model(s) the sub-query response to generate a comprehensive response (e.g., as described herein in relation to block 240 of FIG. 2).

At block 562, the system provides the comprehensive response (e.g., as described herein in relation to block 280). In some implementations, one or more iterations of self critique may also be performed before the comprehensive response is output (e.g., as described herein in relation to blocks 260, 270, and 272 of FIG. 2).

Turning now to FIGS. 6A, 6B, 6C, 6D, 6E, and 6F, an example client device 600 with a display 620 rendering a graphical interface is depicted.

Figure 6A:
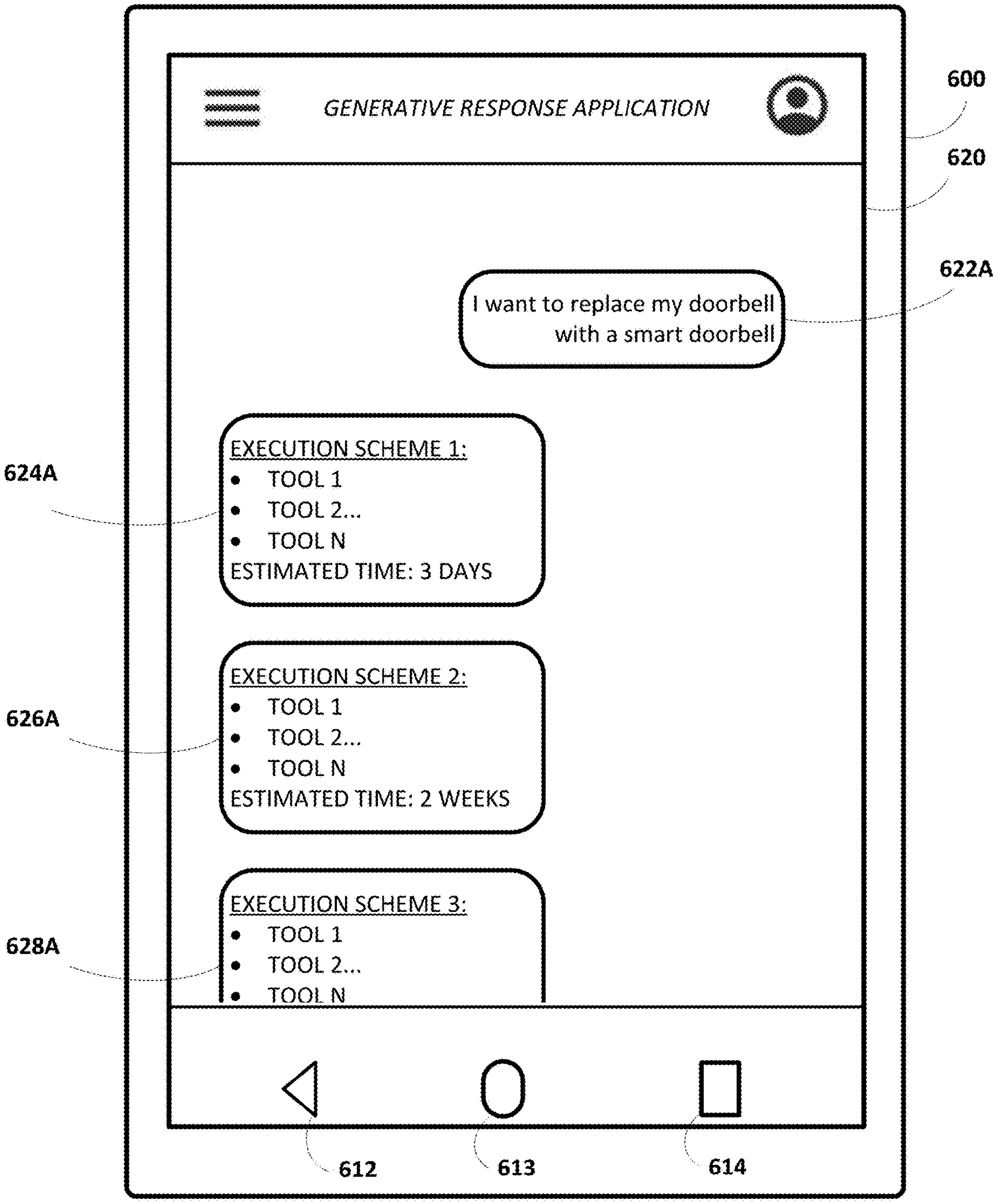
FIG. 6A, FIG. 6B, FIG. 6C, FIGS. 6D, and 6E illustrate various example interactions between a user of a client device and a generative response system application executing at the client device according to implementations described herein.

FIG. 6A illustrates the example client device 600, an example input query 622A (e.g., including the text "I want to replace my doorbell with a smart doorbell"), and graphical interface elements corresponding to a plurality of candidate execution schemes 624A, 6246A, 628A that are provided responsive to the input query 622A. Accordingly, FIG. 6A illustrates a non-limiting example of block 232 being performed, perhaps responsive to determining that the input query 622A does not contain a deadline (e.g., in method 400, a "no" decision is made at block 420) and/or responsive to determining that an execution scheme should be generated and/or processed (e.g., in method 200, a "yes" decision is made at block 220).

As illustrated in FIG. 6A, the graphical interface elements corresponding to a plurality of candidate execution schemes 624A can include information characterizing the corresponding candidate execution scheme. This information can include, for instance, an identifier of the candidate execution scheme (e.g., "EXECUTION SCHEME 1"), the sub-queries and/or tools specified by the execution scheme (e.g., "TOOL 1, TOOL 2 . . . . TOOL N"), an estimated execution time for the sub-queries, the tools and/or the candidate execution scheme (e.g., "ESTIMATED TIME: 3 DAYS"), etc. In some implementations, the graphical interface elements corresponding to the plurality of candidate execution schemes 624A can be selectable. Upon selection of a given one of the candidate execution schemes (e.g., via user interface input indicative of a selection of a selectable graphical interface element corresponding to the given one of the candidate execution schemes, via typing or uttering the identifier of the given one of the candidate execution schemes, etc.,) a number of actions can be performed. For instance, the given one of the candidate execution schemes can be selected as the execution scheme to be proceeded with to generate a comprehensive response (as described herein). Additionally or alternatively, a deadline can be inferred from the given one of the candidate execution schemes (e.g., based on the estimated execution time of the given one of the candidate execution scheme). Additionally or alternatively, a positive determination as to whether to generate and/or process an execution scheme can be made based on one of the candidate execution scheme being selected (e.g., as opposed to a non-comprehensive response (not shown) being selected).

Figure 6B:
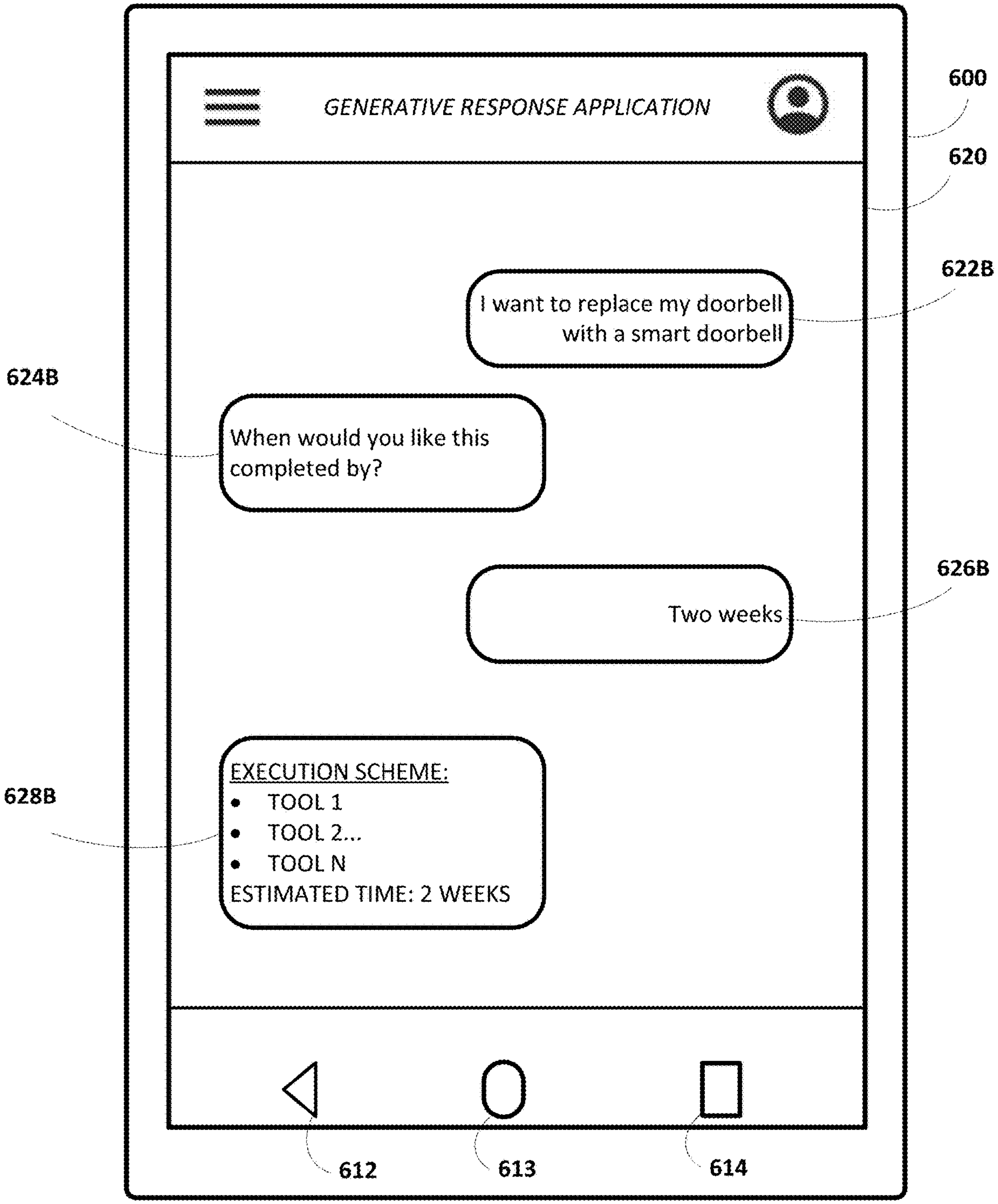

FIG. 6B illustrates the example client device 600, an example input query 622B (e.g., including the text "I want to replace my doorbell with a smart doorbell"), an example prompt for the user to provide a deadline 624B (e.g., including the text "When would you like this completed by?"), an example user reply to the prompt for the user to provide a deadline 626B (e.g., including the text "Two weeks"), and a graphical interface element corresponding to a generated execution scheme 628B that is provided responsive to the input query 622B and the example user reply 626B. Accordingly, FIG. 6B illustrates a non-limiting example of block 232 being performed, perhaps responsive to determining that the input query 622B does not contain a deadline (e.g., in method 400, a "no" decision is made at block 420) and/or responsive to determining that an execution scheme should be generated and/or processed (e.g., in method 200, a "yes" decision is made at block 220).

In some implementations, the example prompt for the user to provide a deadline 624B can be rendered responsive to determining that the input query 622B does not contain a deadline (e.g., in method 400, a "no" decision is made at block 420) and/or responsive to determining that an execution scheme should be generated and/or processed (e.g., in method 200, a "yes" decision is made at block 220). Furthermore, once the example user reply to the prompt 626B has been received, a number of actions can be performed. For instance, the execution scheme can be generated (or selected from among plural candidate execution schemes already generated but possibly not rendered at the client device) based on the example user reply 626B. Additionally or alternatively, a deadline can be inferred from the example user reply 626B (e.g., a deadline of two weeks). Additionally or alternatively, a positive determination as to whether to generate and/or process an execution scheme can be made based on the example user reply 626B including a deadline (e.g., as opposed determining that the example user reply 628B specifies that the response is required immediately, in which case it may be determined to bypass generating and/or processing an execution scheme and instead simply provide a non-comprehensive response).

As illustrated in FIG. 6B, the graphical interface element corresponding to the execution scheme 628B can include information characterizing the execution scheme. This information can include, for instance, an identifier of the execution scheme (e.g., "EXECUTION SCHEME"), the sub-queries and/or tools specified by the execution scheme (e.g., "TOOL 1, TOOL 2 . . . . TOOL N"), an estimated execution time for the sub-queries, the tools and/or the execution scheme (e.g., "ESTIMATED TIME: 2 weeks"), etc.

Figure 6C:
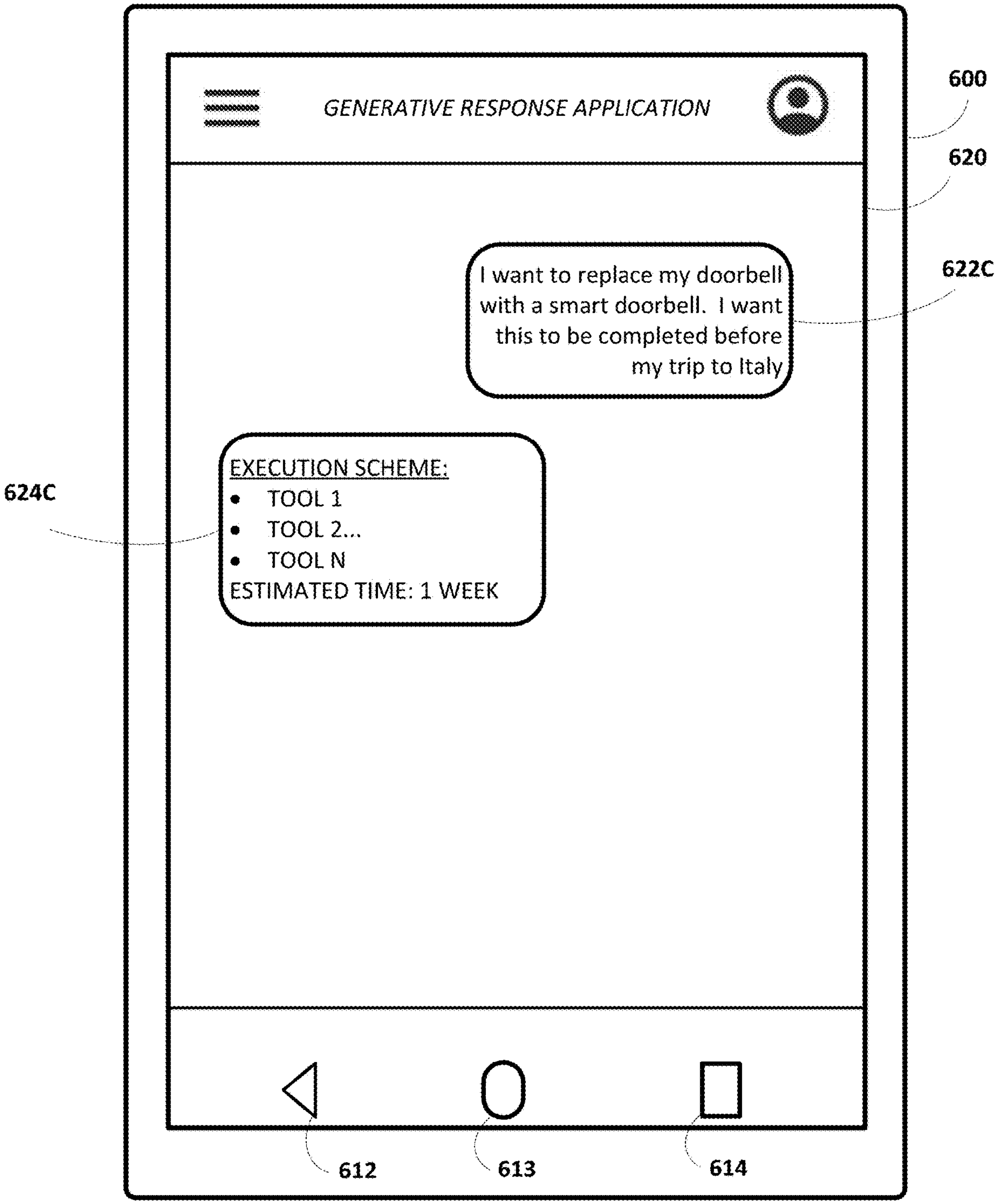

FIG. 6C illustrates the example client device 600, an example input query 622C (e.g., including the text "I want to replace my doorbell with a smart doorbell. I want this to be completed before my trip to Italy"), and a graphical interface element corresponding to an execution schemes 624C that is provided responsive to the input query 622C. Accordingly, FIG. 6C illustrates a non-limiting example of block 232 being performed and/or blocks 410, 420, and 430 being performed (e.g., when in method 400, a "yes" decision is made at block 420). For instance, a deadline can be determined based on the example input query 622C including the text "I want this to be completed before my trip to Italy". In particular, the system can be aware that the user's trip to Italy is in 1 week (e.g., based on previous user interface input, calendar data associated with the user and available to the system when appropriate permissions are granted, etc.). As such, the system can infer a deadline of 1 week to provide a comprehensive response to the example input query 622C.

Figure 6D:
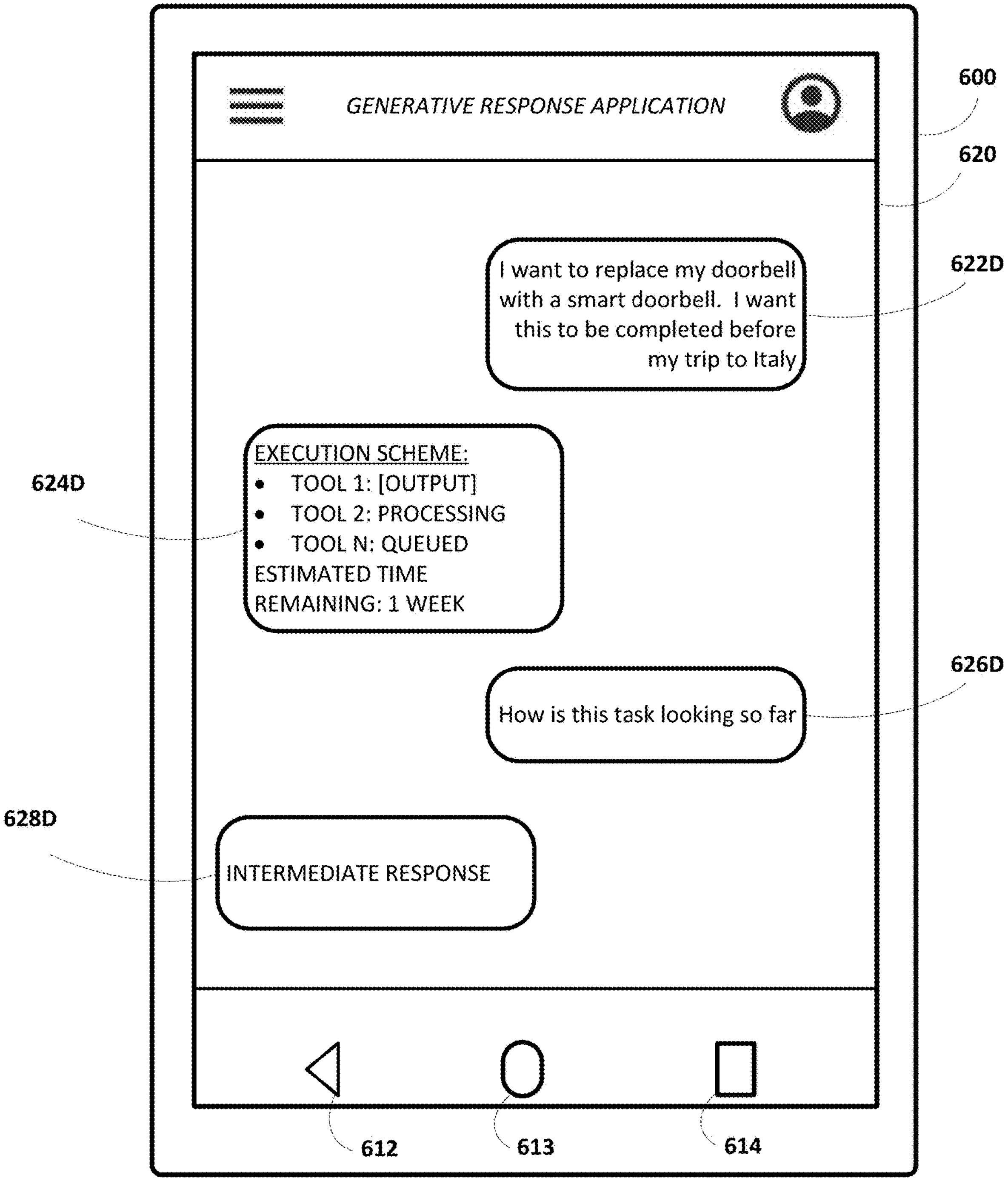

FIG. 6D illustrates the example client device 600, an example input query 622D (e.g., including the text "I want to replace my doorbell with a smart doorbell. I want this to be completed before my trip to Italy"), a graphical interface element corresponding to an execution scheme 624D that is provided responsive to the input query 622D, a subsequent input query 626D corresponding to a request for an intermediate response (e.g., including the text "How is this task looking so far"), and an intermediate response 628D that is provided responsive to the subsequent input query 626D. Accordingly, FIG. 6D illustrates a non-limiting example of block 552 being performed (e.g., when in method 500, a "yes" decision is made at block 550).

Figure 6E:
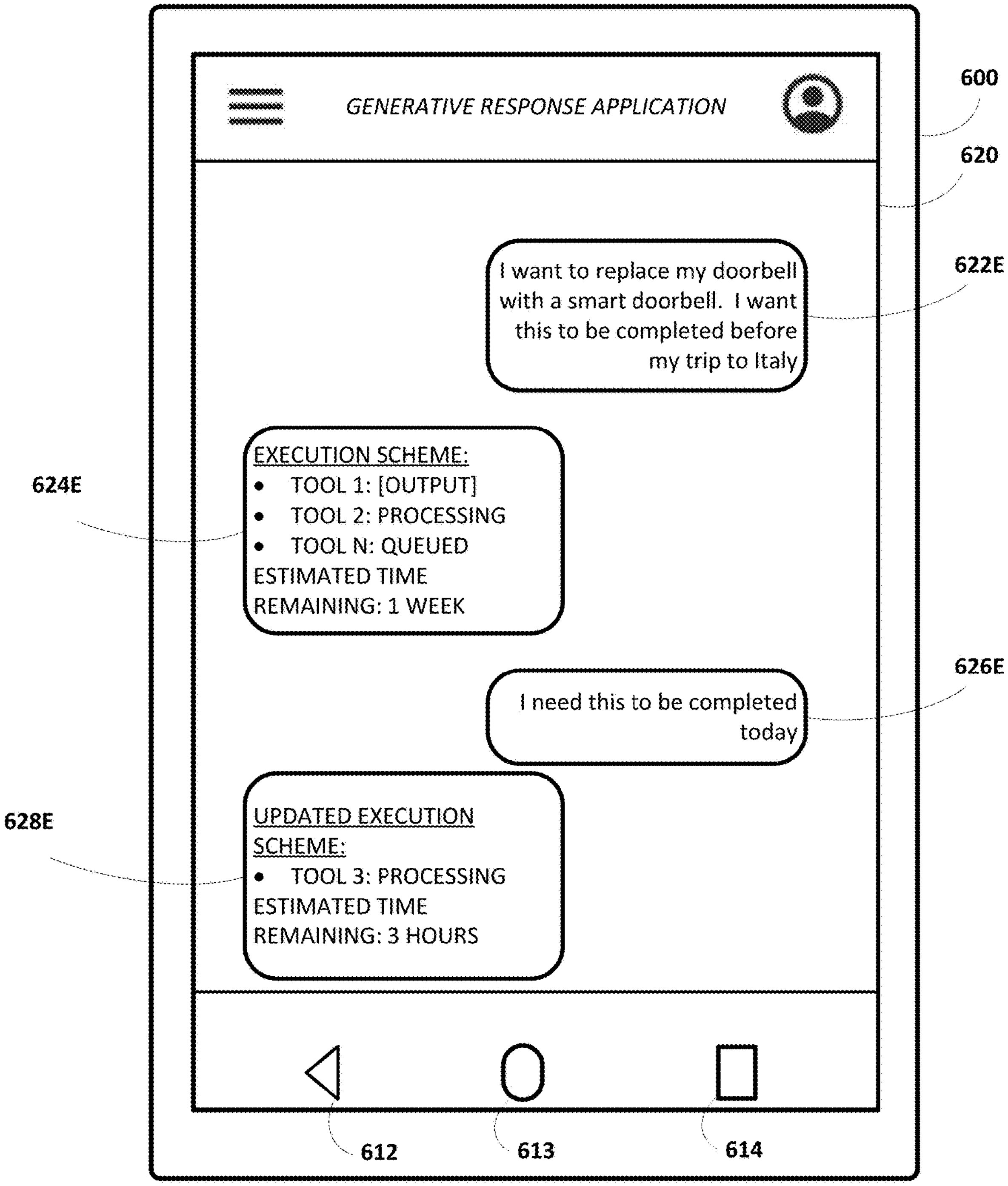

FIG. 6E illustrates the example client device 600, an example input query 622E (e.g., including the text "I want to replace my doorbell with a smart doorbell. I want this to be completed before my trip to Italy"), a graphical interface element corresponding to an execution scheme 624E that is provided responsive to the input query 622E, a subsequent input query 626E corresponding to an indication of an updated deadline (e.g., including the text "I need this to be completed today"), and a graphical interface element corresponding to an updated execution scheme 628E that is provided responsive to the input query 622E and to the subsequent input query 626E. Accordingly, FIG. 6E illustrates a non-limiting example of block 542 being performed (e.g., when in method 500, a "yes" decision is made at block 540).

Figure 6F:
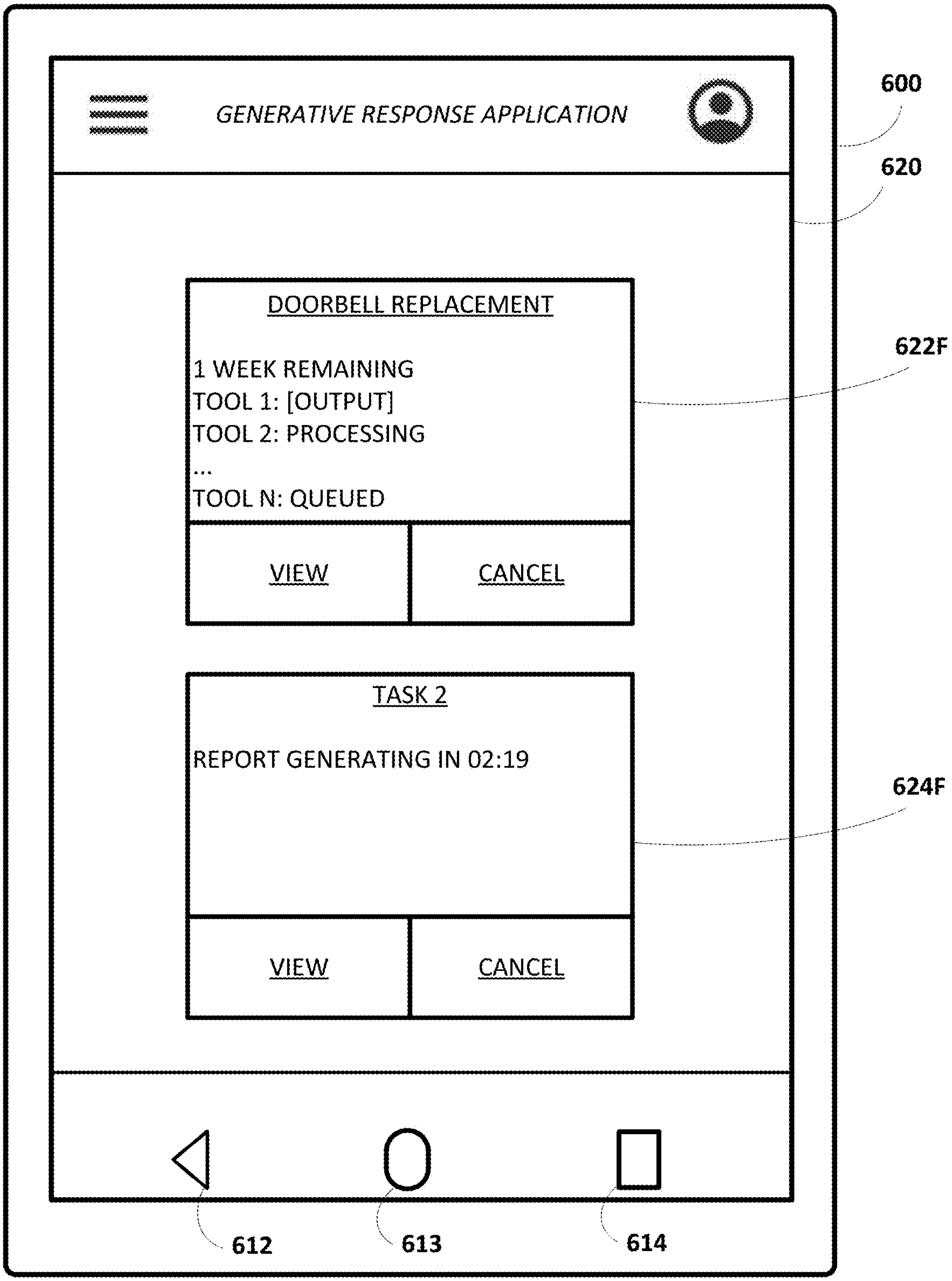
FIG. 6F illustrates an example graphical interface presented at a client device according to implementations described herein.

FIG. 6F illustrates the example client device 600, a first graphical interface element 622F corresponding to a first execution scheme that is currently being processed, and a second graphical interface element 624F corresponding to a second execution scheme that is currently being processed. The graphical interface elements can be generated and/or configured based on GM output from one or more GM(s) (e.g., generating the execution scheme (e.g., in block 230) can include including one or more token(s) in GM output during any one of the inference passes which can be processed to determine a configuration of a graphical interface element corresponding to the execution scheme).

As illustrated in FIG. 6F, the graphical interface element corresponding to the first execution scheme 622F can include information characterizing a progress state of the first execution scheme. This information can include, for instance, an identifier of the first execution scheme (e.g., "DOORBELL REPLACEMENT"), the processed sub-queries and/or tools specified by the first execution scheme, the respective output of the processed sub-queries and/or tools specified by the first execution scheme (e.g., "TOOL 1: [OUTPUT]"), a state of the remaining sub-queries and/or tools to be processed (e.g., "TOOL 2: PROCESSING . . . TOOL N: QUEUED"), an intermediate response generated based on the sub-query responses determined thus far, an estimated remaining execution time of the remaining sub-queries and/or tools (e.g., "1 WEEK REMAINING"), an indication of progress of the execution scheme (e.g., "51% complete"), etc.

In some implementations, the graphical interface element corresponding to the first execution scheme 622F can also include one or more selectable graphical elements. The selectable graphical elements can include, for instance, a selectable graphical element to cancel processing of the first execution scheme (e.g., including the text "CANCEL"). If it is determined that user interface input is received that is indicative of a selection of the selectable graphical element to cancel processing of the first execution scheme, further processing of the first execution scheme can be ceased. In some implementations, an intermediate response, based on the available sub-query responses generated thus far, can be generated and provided, before any further processing of the first execution scheme is ceased. The selectable graphical elements can also include, for instance, a selectable graphical element to view further details regarding the first execution scheme and the progress thereof (e.g., including the text "VIEW"). If it is determined that user interface input is received that is indicative of a selection of the selectable graphical element to view further details, further information regarding the first execution scheme and the progress thereof can be rendered on the client device 600. For instance, prior to selection of the selectable graphical element to view further details, raw output of each of the tools processed thus far can be presented. Then, upon selection of the selectable graphical element to view further details, an intermediate response can be generated and presented at the client device, based on the raw output. Additionally or alternatively, upon selection of the selectable graphical element to view further details, the client device 600 can render additional interactive graphical elements to facilitate subsequent user interface input being received in connection with the first execution scheme (e.g., such as the subsequent user interface input described in relation to FIGS. 6D and 6E).

In some implementations, the graphical interface element corresponding to the second execution scheme 624F can be largely similar to the graphical interface element corresponding to the first execution scheme 624E. However, in some implementations, the graphical elements can be tailored based on the corresponding execution schemes (e.g., based on the corresponding deadlines, based on the remaining estimated execution times, based on the remaining sub-queries to be processed, etc.). In other words, the graphical interface elements can be generated (e.g., based on GM output from one or more GM(s) used to process the input query and/or the execution scheme) to best suit the corresponding deadlines. As an example, for an input query specifying a 20 second task, the graphical interface element can include a selectable timer which indicates the remaining estimated execution time and which is selectable to provide further details regarding the progress of completing the task. On the other hand, for an input query specifying a 20 minute task, a timer indicating the remaining estimated execution time may only be exposed on request.

Turning now to FIG. 7 a flowchart that illustrates an example method 700 of generating a deadline bounded response to an input query is depicted. For convenience, the operations of method 700 are described with reference to a system that performs the operations. This system of method 700 includes one or more processors, memory, and/or other component(s) of computing device(s) (e.g., the response system 120 of FIG. 1). Moreover, while operations of method 700 are shown in a particular order, this is not meant to be limiting. One or more operations may be reordered, omitted, and/or added.

At block 710, the system receives an input query that is generated based on user interface input at a client device. In some implementations, block 710 can be similar to block 210 of method 200.

At block 720, the system generates an execution scheme to comply with a deadline for generating a comprehensive response which is responsive to the input query. Block 720 includes blocks 722 and 724. In some implementations, block 710 can be similar to block 230 of method 200.

In some implementations, the deadline can be determined based on the input query. For instance, the system can identify an explicit or implied deadline contained in the input query. This can be based on processing the input query using a machine learned model (such as the first generative model, or some other model). For instance, the input query can be processed to identify an explicit or implied deadline as an initial operation (e.g., prior to the decomposing of block 722, or even prior to the generating the execution scheme of block 720). In this way, the deadline can be used for determining whether to proceed with generating an execution scheme and/or provided for processing during the generation of the execution scheme (e.g., to influence the decomposing of block 722). As another example, the deadline can be identified as part of the decomposing of block 722. Additionally or alternatively, determining the deadline based on the input query can include mapping the explicit or implied deadline contained in the input query to a relative time remaining to generate the comprehensive response.

In some implementations, the deadline can be determined based on subsequent user input (e.g., when a deadline is not included in the input query). For instance, the system can cause a prompt to be rendered at the client device or the other client device. The prompt can elicit user input indicative of the deadline. The system can receive, responsive to the prompt, subsequent user input. The system can then determine the deadline based on the received subsequent user input.

At block 722, the system decomposes the input query to determine a plurality of sub-queries, and for each of the sub-queries, one or more corresponding tools to utilize in processing the sub-query. Decomposing the input query can include processing the input query, using a first generative model. In some implementations, block 722 can be similar to block 234 of method 200.

In some implementations, the input query can be decomposed a plurality of times to determine multiple sets of sub-queries, each of which corresponding to a candidate execution scheme. Put another way, the system can generate a plurality of candidate execution schemes by, for each of the candidate execution schemes, decomposing the input query to determine a plurality of sub-queries for the candidate execution scheme, and for each of the sub-queries for the candidate execution scheme, one or more corresponding tools to utilize in processing the sub-query. Decomposing the input query can include processing the input query, using a first generative model. Each candidate execution scheme can then be determined based on the plurality of sub-queries for that candidate execution scheme. Each sub-query for the candidate execution scheme can be associated with an estimated execution time. Each candidate execution scheme can therefore be associated with a total estimate execution time based on the estimated execution time for each of the sub-queries for that candidate execution scheme. One of the candidate execution schemes can then be selected as the execution scheme to be proceeded with. As one example, a deadline can be determined (e.g., by any suitable method including those described herein), and the execution scheme can be selected from the candidate execution schemes based on the deadline. For instance, the system can compare the deadline with the total estimated execution times associated with the candidate execution schemes, and the execution scheme can be selected based on the comparison. As another example, the system can cause a prompt to be rendered for each of the candidate execution schemes. The prompts can characterize the total estimated execution time associated with the candidate execution schemes. The system can determined that affirmative user interface input is received responsive to one of these prompts, corresponding to a particular candidate execution scheme, which can then be selected, based on the user interface input. Additionally or alternatively, the candidate execution schemes can be used to determine whether to proceed with the generating and/or processing the execution scheme. For instance, in some implementations, the execution scheme is proceeded with responsive to determining that at least one of the candidate execution schemes is associated with a total estimated execution time which exceeds a threshold total estimated execution time.

At block 724, the system generates the execution scheme based on the plurality of sub-queries. Each sub-query is associated with an estimated execution time. For instance, the estimated execution time for a given sub-query is based on one or more of a type and/or number of corresponding tools to utilize in processing the sub-query, and a degree of tool use for each of the corresponding tools to utilize in processing the sub-query. Generating the execution scheme includes generating the execution scheme such that the total of the estimated execution times for each of the sub-queries complies with the deadline. In some implementations, the execution scheme can also be generated, based on the deadline (or in other words, the available time before the deadline) to specify one or more of a level of self-evaluation to be performed to generate the comprehensive response, and an indication of the generative model to be used for generating the comprehensive response.

At block 730, based on the execution scheme, and for each of the sub-queries, the system processes the sub-query, using the one or more corresponding tools for the sub-query, to generate one or more corresponding sub-query responses. In some implementations, block 730 can be similar to block 240 of method 200.

In some implementations, at least a first sub-query of the sub-queries can be associated with one or more dependencies. Generating the execution scheme can therefore include generating the execution scheme such that processing of each sub-query is to be performed based on the corresponding one or more dependencies. For instance, when the one or more dependencies of the first sub-query includes processing of a second sub-query, processing the sub-queries, based on the execution scheme, can include processing the second sub-query, using the one or more corresponding tools for the second sub-query; and subsequently, processing the first sub-query, using the one or more corresponding tools for the first sub-query. As another example, when the one or more dependencies of the first sub-query includes an occurrence of an external event, processing the sub-queries, based on the execution scheme, can include determining that the external event has occurred; and subsequently processing the first sub-query, using the one or more corresponding tools for the first sub-query.

Additionally or alternatively, processing the sub-queries, based on the execution scheme, can include deferring processing of at least one sub-query of the plurality of sub-queries until a particular time period has commenced. Then, once it has been determined that the particular time period has commenced, the system can process, during the particular time period, the at least one sub-query, using the one or more corresponding tools for the at least one sub-query. In some implementations, deferring processing of the at least one sub-query of the plurality of sub-queries until the specified time period has commenced can be responsive to determining that the corresponding one or more dependencies do not include processing the at least one sub-query. Additionally or alternatively, determining that the particular time period has commenced can include determining that a period of low utilization of a computing device associated with processing the at least one sub-query has commenced.

In some implementations, the processing of the execution scheme can be interrupted before completion. As one example, at a first time before each of the sub-queries of the execution scheme have been processed, the system can generate an intermediate response to the input query. Generating the intermediate response can include processing, using the first generative model and/or a second generative model, the one or more corresponding sub-query responses that have been generated at the first time. The system can then cause the intermediate response to be rendered, at the client device or another client device, as responsive to the input query. For instance, this can be performed responsive to determining that user interface input is received that is indicative of a request for an intermediate response which is responsive to the input query. Additionally or alternatively, this can be performed responsive to determining that an execution time of the remaining sub-queries to be processed does not comply with the deadline.

Additionally or alternatively, at a second time before each of the sub-queries of the execution scheme have been processed, the system can determine, based on the sub-queries that have been processed at the second time and/or the sub-query responses that have been generated at the second time, a progress state of the execution scheme. The system can then cause a user interface element indicative of the progress state of the execution scheme to be rendered at the client device or the other client device. In some implementations, the content to be included in the user interface element can be tailored, based on the deadline. In some implementations, the progress state of the execution scheme can include a total estimated remaining execution time to provide the comprehensive response (e.g., based on the estimated execution times of each of the remaining sub-queries to be processed). Additionally or alternatively, the progress state of the execution scheme can include one or more of the sub-query responses that have been generated at the second time.

Additionally or alternatively, at a third time before each of the sub-queries of the execution scheme have been processed, the system can receive user interface input indicative of an updated deadline. The system can generate an updated execution scheme to comply with the updated deadline for generating a comprehensive response which is responsive to the input query. In addition, further processing of the original (or previous) execution scheme can be ceased. Generating the updated execution scheme can include generating the execution scheme such that a total of estimated execution times for each of the sub-queries of the updated execution scheme complies with the updated deadline. In response to determining that each of the sub-queries of the updated execution scheme have been processed, the system can generate a comprehensive response to the input query, and cause the comprehensive response to be rendered, at the client device or the other client device, as responsive to the input query.

At block 740, in response to determining that each of the sub-queries of the execution scheme have been processed, the system generates the comprehensive response to the input query. Generating the comprehensive response can include processing, using the first generative model and/or a second generative model, the one or more corresponding sub-query responses for each of the sub-queries.

At block 750, the system causes the comprehensive response to be rendered, at the client device or another client device determined to be associated with the client device, as responsive to the input query. In some implementations, causing the comprehensive response to be rendered at a particular client device includes transmitting data to the particular client device that is operable for causing the particular client device to render the comprehensive response. In some implementations, block 750 can be similar to block 280 of method 200.

Figure 8:
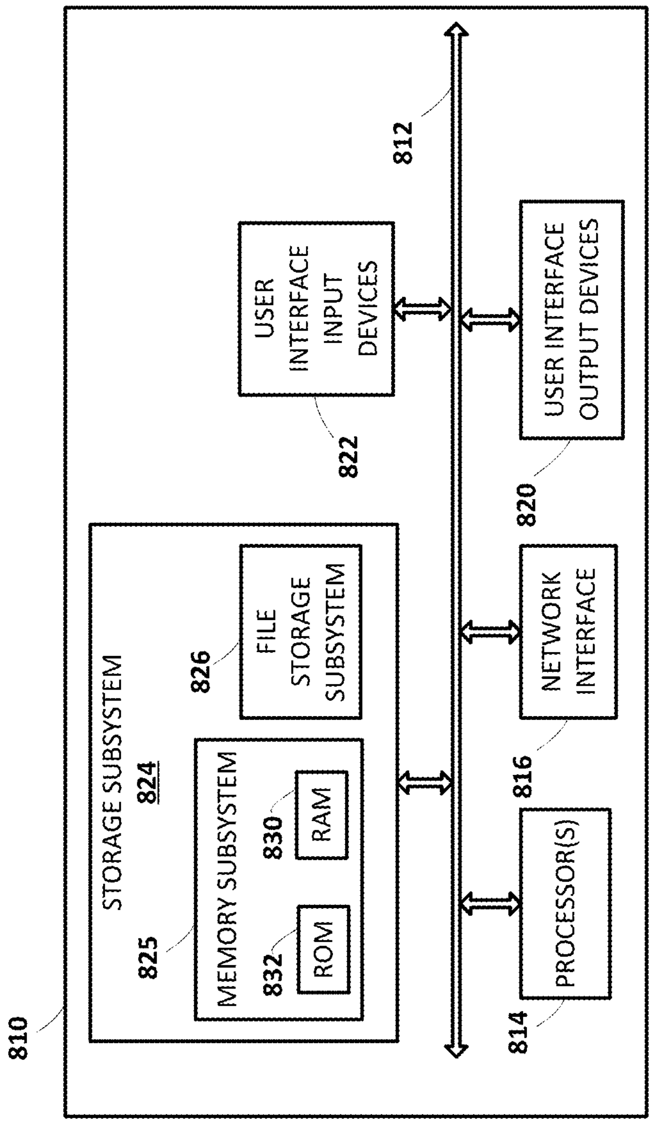
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/or other component(s) may include one or more components of the example computing device 810.

Computing device 810 typically includes at least one processor 814 which communicates with a number of peripheral devices via bus subsystem 812. These peripheral devices may include a storage subsystem 824, including, for example, a memory subsystem 625 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some, or all, of the modules described herein. For example, the storage subsystem 824 may include the logic to perform selected aspects of the methods disclosed herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by processor(s) is provided and includes receiving an input query that is generated based on user interface input at a client device; generating an execution scheme to comply with a deadline for generating a comprehensive response which is responsive to the input query, generating the execution scheme including: decomposing the input query, decomposing the input query including processing the input query, using a first generative model, to determine: a plurality of sub-queries, and for each of the sub-queries, one or more corresponding tools to utilize in processing the sub-query; and generating the execution scheme based on the plurality of sub-queries, wherein each sub-query is associated with an estimated execution time, and wherein generating the execution scheme includes generating the execution scheme such that the total of the estimated execution times for each of the sub-queries complies with the deadline; based on the execution scheme, and for each of the sub-queries: processing the sub-query, using the one or more corresponding tools for the sub-query, to generate one or more corresponding sub-query responses; in response to determining that each of the sub-queries of the execution scheme have been processed, generating the comprehensive response to the input query, generating the comprehensive response including processing, using the first generative model and/or a second generative model, the one or more corresponding sub-query responses for each of the sub-queries; and causing the comprehensive response to be rendered, at the client device or another client device determined to be associated with the client device, as responsive to the input query.

These and other implementations disclosed herein can include one or more of the following features.

In some implementations, the method further includes: determining the deadline based on the input query, determining the deadline including: identifying an explicit or implied deadline contained in the input query based on processing, using the first generative model, the second generative model and/or another machine learned model, the input query. In some versions of those implementations, determining the deadline based on the input query further includes: mapping the explicit or implied deadline contained in the input query to a relative time remaining to generate the comprehensive response. In some additional or alternative versions of those implementations, decomposing the input query includes processing the input query and the deadline using the first generative model. In some additional or alternative versions of those implementations, decomposing the input query is further to: identify the explicit or implied deadline contained in the input query.

In some additional or alternative implementations, generating the execution scheme is responsive to determining that the input query contains an explicit or implied deadline.

In some additional or alternative implementations: the method further includes: causing a prompt to be rendered at the client device or the other client device, wherein the prompt elicits user input indicative of the deadline; receiving, responsive to the prompt, subsequent user input; and determining the deadline based on the received subsequent user input.

In some additional or alternative implementations, generating the execution scheme includes: generating a plurality of candidate execution schemes, generating each of the plurality of candidate execution schemes including: decomposing the input query, decomposing the input query including processing the input query, using a first generative model, to determine: a plurality of sub-queries for the candidate execution scheme, and for each of the sub-queries for the candidate execution scheme, one or more corresponding tools to utilize in processing the sub-query; and generating the candidate execution scheme based on the plurality of sub-queries for the candidate execution scheme, wherein each sub-query for the candidate execution scheme is associated with an estimated execution time, and wherein the candidate execution scheme is associated with a total estimate execution time based on the estimated execution time for each of the sub-queries for the candidate execution scheme; determining the deadline; comparing the deadline with the total estimated execution times associated with the candidate execution schemes; and selecting, based on the comparison, one of the candidate execution schemes as the execution scheme to comply with the deadline. In some alternative implementations, generating the execution scheme includes: generating a plurality of candidate execution schemes, generating each of the plurality of candidate execution schemes including: decomposing the input query, decomposing the input query including processing the input query, using a first generative model, to determine: a plurality of sub-queries for the candidate execution scheme, and for each of the sub-queries for the candidate execution scheme, one or more corresponding tools to utilize in processing the sub-query; and generating the candidate execution scheme based on the plurality of sub-queries for the candidate execution scheme, wherein each sub-query for the candidate execution scheme is associated with an estimated execution time, and wherein the candidate execution scheme is associated with a total estimated execution time based on the estimated execution time for each of the sub-queries for the candidate execution scheme; for each of the candidate execution schemes, causing a prompt to be rendered, at the client device or the other client device, that characterizes the total estimated execution time associated with the candidate execution scheme; determining that affirmative user interface input is received responsive to a first prompt corresponding to a first candidate execution scheme; and selecting, based on the user interface input, the first candidate execution scheme as the execution scheme to comply with the deadline. In some versions of those implementations, proceeding with the execution scheme is responsive to determining that at least one of the candidate execution schemes is associated with a total estimated execution time which exceeds a threshold total estimated execution time.

In some additional or alternative implementations, at least a first sub-query of the sub-queries is associated with one or more dependencies, and generating the execution scheme includes generating the execution scheme such that processing of each sub-query is to be performed based on the corresponding one or more dependencies. In some versions of those implementations, the one or more dependencies of the first sub-query includes processing of a second sub-query, and wherein processing the sub-queries, based on the execution scheme, includes: processing the second sub-query, using the one or more corresponding tools for the second sub-query; and subsequently: processing the first sub-query, using the one or more corresponding tools for the first sub-query. In some additional or alternative versions of those implementations, the one or more dependencies of the first sub-query includes occurrence of an external event, and processing the sub-queries, based on the execution scheme, includes: determining that the external event has occurred; and subsequently: processing the first sub-query, using the one or more corresponding tools for the first sub-query.

In some additional or alternative versions of those implementations, processing the sub-queries, based on the execution scheme, includes: deferring processing of at least one sub-query of the plurality of sub-queries until a particular time period has commenced; determining that the particular time period has commenced; and processing, during the particular time period, the at least one sub-query, using the one or more corresponding tools for the at least one sub-query. In some further versions of those implementations, wherein deferring processing of the at least one sub-query of the plurality of sub-queries until the specified time period has commenced is responsive to determining that the corresponding one or more dependencies do not include processing the at least one sub-query. In some additional or alternative further versions of those implementations, determining that the particular time period has commenced includes determining that a period of low utilization of a computing device associated with processing the at least one sub-query.

In some additional or alternative implementations, the estimated execution time for a given sub-query is based on one or more of: a type and/or number of corresponding tools to utilize in processing the sub-query, and a degree of tool use for each of the corresponding tools to utilize in processing the sub-query.

In some additional or alternative implementations, the execution scheme specifies one or more of: a level of self-evaluation to be performed to generate the comprehensive response, and an indication of the generative model to be used for generating the comprehensive response.

In some additional or alternative implementations, the method further includes: at a first time before each of the sub-queries of the execution scheme have been processed: generating an intermediate response to the input query, generating the intermediate response including processing, using the first generative model and/or the second generative model, the one or more corresponding sub-query responses that have been generated at the first time; and causing the intermediate response to be rendered, at the client device or the other client device, as responsive to the input query. In some versions of those implementations, generating the intermediate response and/or causing the intermediate response to be rendered, at the client device or the other client device, is responsive to determining that user interface input is received that is indicative of a request for an intermediate response which is responsive to the input query. In some additional or alternative versions of those implementations, generating the intermediate response and/or causing the intermediate response to be rendered, at the client device or the other client device, is responsive to determining that an estimated execution time of the remaining sub-queries to be processed does not comply with the deadline.

In some additional or alternative implementations, the method further includes: at a second time before each of the sub-queries of the execution scheme have been processed: determining, based on the sub-queries that have been processed at the second time and/or the sub-query responses that have been generated at the second time, a progress state of the execution scheme; and causing a user interface element indicative of the progress state of the execution scheme to be rendered at the client device or the other client device. In some versions of those implementations, the method further includes: tailoring, based on the deadline, content to be included in the user interface element. In some additional or alternative implementations, the progress state of the execution scheme includes a total estimated remaining execution time to provide the comprehensive response based on the estimated execution times of each of the remaining sub-queries to be processed. In some additional or alternative implementations the progress state of the execution scheme includes one or more of the sub-query responses that have been generated at the second time.

In some additional or alternative implementations, the method further includes: at a third time before each of the sub-queries of the execution scheme have been processed: receiving user interface input indicative of an updated deadline; generating an updated execution scheme to comply with the updated deadline for generating a comprehensive response which is responsive to the input query, wherein generating the updated execution scheme includes generating the execution scheme such that a total of estimated execution times for each of the sub-queries of the updated execution scheme complies with the updated deadline; in response to determining that each of the sub-queries of the updated execution scheme have been processed, generating the comprehensive response to the input query; and causing the comprehensive response to be rendered, at the client device or the other client device, as responsive to the input query.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving an input query that is generated based on user interface input at a client device;

determining a deadline, for generating a comprehensive response which is responsive to the input query, based on the input query, determining the deadline based on the input query comprising:

identifying an explicit or implied deadline contained in the input query based on processing, using a first generative model, a second generative model and/or another machine learned model, the input query;

generating an execution scheme to comply with the deadline for generating a comprehensive response which is responsive to the input query, generating the execution scheme comprising:

decomposing the input query, decomposing the input query comprising processing the input query, using the first generative model, to determine:

a plurality of sub-queries, and for each of the sub-queries, one or more corresponding tools to utilize in processing the sub-query; and generating the execution scheme based on the plurality of sub-queries, wherein each sub-query is associated with an estimated execution time, and wherein generating the execution scheme comprises generating the execution scheme such that the total of the estimated execution times for each of the sub-queries complies with the deadline;

based on the execution scheme, and for each of the sub-queries:

processing the sub-query, using the one or more corresponding tools for the sub-query, to generate one or more corresponding sub-query responses;

in response to determining that each of the sub-queries of the execution scheme have been processed, generating the comprehensive response to the input query, generating the comprehensive response comprising processing, using the first generative model and/or the second generative model, the one or more corresponding sub-query responses for each of the sub-queries; and causing the comprehensive response to be rendered, at the client device or another client device determined to be associated with the client device, as responsive to the input query.

2. The method of claim 1, wherein the determining the deadline based on the input query further comprises:

mapping the explicit or implied deadline contained in the input query to a relative time remaining to generate the comprehensive response.

3. The method of claim 1, wherein the decomposing the input query comprises processing the input query and the deadline using the first generative model.

4. The method of claim 1, wherein the decomposing the input query is further to:

identify the explicit or implied deadline contained in the input query.

5. The method of claim 1, wherein the generating the execution scheme is responsive to determining that the input query contains an explicit or implied deadline.

6. The method of claim 1, further comprising:

causing a prompt to be rendered at the client device or the other client device, wherein the prompt elicits user input indicative of the deadline;

receiving, responsive to the prompt, subsequent user input; and determining the deadline based on the received subsequent user input.

7. The method of claim 1, wherein the generating the execution scheme comprises:

generating a plurality of candidate execution schemes, generating each of the plurality of candidate execution schemes comprising:

decomposing the input query, decomposing the input query comprising processing the input query, using the first generative model, to determine:

a plurality of sub-queries for the candidate execution scheme, and for each of the sub-queries for the candidate execution scheme, one or more corresponding tools to utilize in processing the sub-query; and generating the candidate execution scheme based on the plurality of sub-queries for the candidate execution scheme, wherein each sub-query for the candidate execution scheme is associated with an estimated execution time, and wherein the candidate execution scheme is associated with a total estimated execution time based on the estimated execution time for each of the sub-queries for the candidate execution scheme;

determining the deadline;

comparing the deadline with the total estimated execution times associated with the candidate execution schemes; and selecting, based on the comparison, one of the candidate execution schemes as the execution scheme to comply with the deadline.

8. The method of claim 1, wherein the generating the execution scheme comprises:

generating a plurality of candidate execution schemes, generating each of the plurality of candidate execution schemes comprising:

decomposing the input query, decomposing the input query comprising processing the input query, using the first generative model, to determine:

a plurality of sub-queries for the candidate execution scheme, and for each of the sub-queries for the candidate execution scheme, one or more corresponding tools to utilize in processing the sub-query; and generating the candidate execution scheme based on the plurality of sub-queries for the candidate execution scheme, wherein each sub-query for the candidate execution scheme is associated with an estimated execution time, and wherein the candidate execution scheme is associated with a total estimated execution time based on the estimated execution time for each of the sub-queries for the candidate execution scheme;

for each of the candidate execution schemes, causing a prompt to be rendered, at the client device or the other client device, that characterizes the total estimated execution time associated with the candidate execution scheme;

determining that affirmative user interface input is received responsive to a first prompt corresponding to a first candidate execution scheme; and selecting, based on the user interface input, the first candidate execution scheme as the execution scheme to comply with the deadline.

9. The method of claim 8, wherein the proceeding with the execution scheme is responsive to determining that at least one of the candidate execution schemes is associated with a total estimated execution time which exceeds a threshold total estimated execution time.

10. The method of claim 1, wherein at least a first sub-query of the sub-queries is associated with one or more dependencies, and wherein generating the execution scheme comprises generating the execution scheme such that processing of each sub-query is to be performed based on the corresponding one or more dependencies.

11. The method of claim 10, wherein the one or more dependencies of the first sub-query comprises processing of a second sub-query, and wherein processing the sub-queries, based on the execution scheme, comprises:

processing the second sub-query, using the one or more corresponding tools for the second sub-query; and subsequently:

processing the first sub-query, using the one or more corresponding tools for the first sub-query.

12. The method of claim 10, wherein the one or more dependencies of the first sub-query comprises occurrence of an external event, and wherein processing the sub-queries, based on the execution scheme, comprises:

determining that the external event has occurred; and subsequently:

processing the first sub-query, using the one or more corresponding tools for the first sub-query.

13. The method of claim 10, wherein the processing the sub-queries, based on the execution scheme, comprises:

deferring processing of at least one sub-query of the plurality of sub-queries until a particular time period has commenced;

determining that the particular time period has commenced; and processing, during the particular time period, the at least one sub-query, using the one or more corresponding tools for the at least one sub-query.

14. The method of claim 13, wherein the deferring processing of the at least one sub-query of the plurality of sub-queries until the particular time period has commenced is responsive to determining that the corresponding one or more dependencies do not include processing the at least one sub-query.

15. The method of claim 13, wherein the determining that the particular time period has commenced comprises determining that a period of low utilization of a computing device associated with processing the at least one sub-query has commenced.

16. The method of claim 1, wherein the estimated execution time for a given sub-query is based on one or more of:

a type and/or number of corresponding tools to utilize in processing the sub-query, and a degree of tool use for each of the corresponding tools to utilize in processing the sub-query.

17. The method of claim 1, wherein the execution scheme specifies one or more of:

a level of self-evaluation to be performed to generate the comprehensive response, and an indication of the generative model to be used for generating the comprehensive response.

18. The method of claim 1, further comprising:

at a first time before each of the sub-queries of the execution scheme have been processed:

generating an intermediate response to the input query, generating the intermediate response comprising processing, using the first generative model and/or the second generative model, the one or more corresponding sub-query responses that have been generated at the first time; and causing the intermediate response to be rendered, at the client device or the other client device, as responsive to the input query.

19. The method of claim 1, further comprising:

at a second time before each of the sub-queries of the execution scheme have been processed:

determining, based on the sub-queries that have been processed at the second time and/or the sub-query responses that have been generated at the second time, a progress state of the execution scheme; and causing a user interface element indicative of the progress state of the execution scheme to be rendered at the client device or the other client device.

20. The method of claim 1, further comprising:

at a third time before each of the sub-queries of the execution scheme have been processed:

receiving user interface input indicative of an updated deadline;

generating an updated execution scheme to comply with the updated deadline for generating a comprehensive response which is responsive to the input query, wherein the generating the updated execution scheme comprises generating the execution scheme such that a total of estimated execution times for each of the sub-queries of the updated execution scheme complies with the updated deadline;

in response to determining that each of the sub-queries of the updated execution scheme have been processed, generating the comprehensive response to the input query; and causing the comprehensive response to be rendered, at the client device or the other client device, as responsive to the input query.

21. A method implemented by one or more processors, the method comprising:

receiving an input query that is generated based on user interface input at a client device;

causing a prompt to be rendered at the client device or an other client device, wherein the prompt elicits user input indicative of a deadline for generating a comprehensive response which is responsive to the input query;

receiving, responsive to the prompt, subsequent user input;

determining the deadline based on the received subsequent user input;

generating an execution scheme to comply with the deadline for generating a comprehensive response which is responsive to the input query, generating the execution scheme comprising:

decomposing the input query, decomposing the input query comprising processing the input query, using a first generative model, to determine:

a plurality of sub-queries, and for each of the sub-queries, one or more corresponding tools to utilize in processing the sub-query; and generating the execution scheme based on the plurality of sub-queries, wherein each sub-query is associated with an estimated execution time, and wherein generating the execution scheme comprises generating the execution scheme such that the total of the estimated execution times for each of the sub-queries complies with the deadline, wherein generating the execution scheme comprises generating the execution scheme such that processing of each sub-query is to be performed based on the corresponding one or more dependencies;

based on the execution scheme, and for each of the sub-queries:

processing the sub-query, using the one or more corresponding tools for the sub-query, to generate one or more corresponding sub-query responses;

in response to determining that each of the sub-queries of the execution scheme have been processed, generating the comprehensive response to the input query, generating the comprehensive response comprising processing, using the first generative model and/or a second generative model, the one or more corresponding sub-query responses for each of the sub-queries; and causing the comprehensive response to be rendered, at the client device or the other client device determined to be associated with the client device, as responsive to the input query.

22. A method implemented by one or more processors, the method comprising:

receiving an input query that is generated based on user interface input at a client device;

generating an execution scheme to comply with a deadline for generating a comprehensive response which is responsive to the input query, generating the execution scheme comprising:

decomposing the input query, decomposing the input query comprising processing the input query, using a first generative model, to determine:

a plurality of sub-queries, and for each of the sub-queries, one or more corresponding tools to utilize in processing the sub-query; and generating the execution scheme based on the plurality of sub-queries, wherein each sub-query is associated with an estimated execution time, and wherein generating the execution scheme comprises generating the execution scheme such that the total of the estimated execution times for each of the sub-queries complies with the deadline, wherein the execution scheme specifies one or more of:

a level of self-evaluation to be performed to generate the comprehensive response, and an indication of the generative model to be used for generating the comprehensive response;

based on the execution scheme, and for each of the sub-queries:

processing the sub-query, using the one or more corresponding tools for the sub-query, to generate one or more corresponding sub-query responses;

in response to determining that each of the sub-queries of the execution scheme have been processed, generating the comprehensive response to the input query, generating the comprehensive response comprising processing, using the first generative model and/or a second generative model, the one or more corresponding sub-query responses for each of the sub-queries; and causing the comprehensive response to be rendered, at the client device or another client device determined to be associated with the client device, as responsive to the input query.

* * * * *